US009740740B1

(12) United States Patent
Jett et al.

(10) Patent No.: US 9,740,740 B1
(45) Date of Patent: Aug. 22, 2017

(54) USING METADATA TO TAKE ACTION ON AN SMS MESSAGE ON A PROPRIETARY SYSTEM

(71) Applicant: Pebble Technology, Corp., Redwood City, CA (US)

(72) Inventors: Brian Jett, Indianapolis, IN (US); Henry Levak, San Mateo, CA (US); Robert Earl Yawn, Amsterdam (NE)

(73) Assignee: Pebble Technology Corp., Redwood City, CA (US)

( * ) Notice: Subject to any disclaimer, the term of this patent is extended or adjusted under 35 U.S.C. 154(b) by 0 days.

(21) Appl. No.: 15/050,080

(22) Filed: Feb. 22, 2016

(51) Int. Cl.
*G06F 17/30* (2006.01)
*H04W 4/16* (2009.01)
*H04W 4/14* (2009.01)
*H04M 3/42* (2006.01)
*G06F 1/16* (2006.01)

(52) U.S. Cl.
CPC ........ *G06F 17/30477* (2013.01); *G06F 1/163* (2013.01); *H04M 3/42025* (2013.01); *H04W 4/14* (2013.01); *H04W 4/16* (2013.01)

(58) Field of Classification Search
CPC ......... H04W 4/008; H04W 4/14; H04W 4/16; H04W 68/005; H04W 76/023; H04M 1/72527; H04M 1/72597; H04M 1/7253; G06F 1/163; H04L 65/1016; H04L 65/1006; H04L 63/061; H04L 63/062; H04L 63/08; H04L 63/0807; H04L 63/0823; H04L 9/321; H04L 9/3213
See application file for complete search history.

(56) References Cited

U.S. PATENT DOCUMENTS

| | | | |
|---|---|---|---|
| D733,142 S | 6/2015 | Solomon et al. | |
| D743,278 S | 11/2015 | Solomon et al. | |
| D745,515 S | 12/2015 | Solomon et al. | |
| D750,625 S | 3/2016 | Solomon et al. | |
| D752,583 S | 3/2016 | Solomon et al. | |
| D755,178 S | 5/2016 | Solomon et al. | |

(Continued)

FOREIGN PATENT DOCUMENTS

| | | |
|---|---|---|
| EP | 2504961 | 10/2012 |
| EP | 002655142-0001 | 3/2015 |
| EP | 002655118-0001 | 4/2015 |

*Primary Examiner* — George Eng
*Assistant Examiner* — Hung Du
(74) *Attorney, Agent, or Firm* — Rutan & Tucker LLP

(57) ABSTRACT

Apparatuses, systems, and processes are discussed for using metadata to take action on an SMS message on a proprietary system. In some embodiments, a wearable electronic device has a wearable device application that can present an SMS notification from an SMS application of a mobile computing device. The wearable device application can provide SMS notification data to a partner application of the mobile computing device. The partner application can perform a reverse look-up in a contacts application of the mobile computing device and construct a first contacts list with potential SMS-message senders. The wearable device application can present one or more SMS-message actions to a user of the wearable electronic device for a user selection thereof. The partner application can communicate with a partner server, which, in turn, can communicate with an SMS provider to effect the user selection of the one or more SMS-message actions.

17 Claims, 16 Drawing Sheets

(56) References Cited

U.S. PATENT DOCUMENTS

| | | | |
|---|---|---|---|
| 9,419,799 B1* | 8/2016 | Chung | H04L 9/321 |
| 2012/0302198 A1* | 11/2012 | Ku | H04W 4/028 |
| | | | 455/404.2 |
| 2013/0040610 A1 | 2/2013 | Migicovsky et al. | |
| 2014/0133399 A1* | 5/2014 | Kim | H04W 4/14 |
| | | | 370/328 |
| 2014/0179358 A1* | 6/2014 | Khan | H04W 4/12 |
| | | | 455/466 |
| 2015/0126117 A1 | 5/2015 | Wong et al. | |
| 2015/0223033 A1 | 8/2015 | Migicovsky et al. | |
| 2015/0223034 A1 | 8/2015 | Migicovsky et al. | |
| 2015/0333302 A1 | 11/2015 | Johns et al. | |
| 2015/0334772 A1 | 11/2015 | Wong et al. | |
| 2015/0341903 A1* | 11/2015 | Jeong | H04W 68/02 |
| | | | 455/458 |
| 2016/0014266 A1* | 1/2016 | Bhatt | H04M 1/7253 |
| | | | 455/556.1 |
| 2016/0028737 A1* | 1/2016 | Srinivasan | H04L 63/102 |
| | | | 726/1 |

* cited by examiner

USING METADATA TO TAKE ACTION ON AN SMS MESSAGE ON A PROPRIETARY SYSTEM

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD

Embodiments generally relate to using metadata to take action on an SMS message on a proprietary system.

BACKGROUND

Due to certain limitations imposed by proprietary systems, users of wearable electronic devices might not be able to act on incoming SMS messages on the wearable electronic devices.

SUMMARY

Apparatuses, systems, and processes are discussed for using metadata to take action on an SMS message on a proprietary system.

In some embodiments, an apparatus has a wearable device application resident in a first memory of a wearable electronic device. The wearable device application can cooperate with one or more processors to execute instructions to present an SMS notification of an SMS message from an SMS application resident in a first memory of a mobile computing device. The SMS notification can display on a display screen of the wearable electronic device. The wearable device application can cooperate with the one or more processors to execute instructions to analyze the SMS notification and create a set of notification data that is derived from the SMS message. The wearable device application can cooperate with the one or more processors to execute instructions to provide the notification data from the SMS notification to either a partner application resident in a second memory of the mobile computing device or a search module over a wide area network, via an input circuit, on a partner server. Either the partner application or the search module can perform a reverse look-up query using the notification data in one or more fields of a contacts list of a user a contacts list of a user resident in the wearable electronic device, mobile computing device, or the partner server. Either the partner application or the search module can construct a first list with potential SMS-message senders derived from search results of the reverse look-up query. The wearable device application can cooperate with the one or more processors to execute instructions to present a user interface with one or more SMS-message actions on the display screen to the user for a user selection of the one or more SMS-message actions. The wearable device application can communicate with the partner server, optionally via the partner application, in order to effect the user selection of the one or more SMS-message actions chosen from the wearable device application without the user needing to open and run the SMS application on the mobile computing device. The partner server has an API module that can communicate in a schema and format required by an API of an SMS provider.

In some embodiments, a system has the foregoing apparatus and one or more servers of at least one SMS provider.

In some embodiments, a method can present an SMS notification of an SMS message with a wearable device application resident in a first memory of a wearable electronic device. The SMS message can be from an SMS application resident in a first memory of a mobile computing device. In some embodiments, the method can provide notification data from the SMS notification to either i) a partner application resident in a second memory of the mobile computing device or ii) a search module over a wide area network, via an input circuit, on a partner server. Either the partner application or the search module can perform a reverse look-up query using the notification data in one or more fields of a contacts list of a user of the wearable electronic device. Either the partner application or the search module can construct a first list with potential SMS-message senders derived from search results of the reverse look-up query. In some embodiments, the method can present one or more SMS-message actions on a display screen of the wearable electronic device to a user of the wearable electronic device for a user selection of the one or more SMS-message actions. The wearable device application can communicate with the partner server, optionally via the partner application, in order to effect the user selection of the one or more SMS-message actions chosen from the wearable device application without the user needing to open and run the SMS application on the mobile computing device. The partner server has an API module that can communicate in a schema and format required by an API of an SMS provider.

DRAWINGS

The drawings refer to embodiments of the design in which.

Figure 1A:
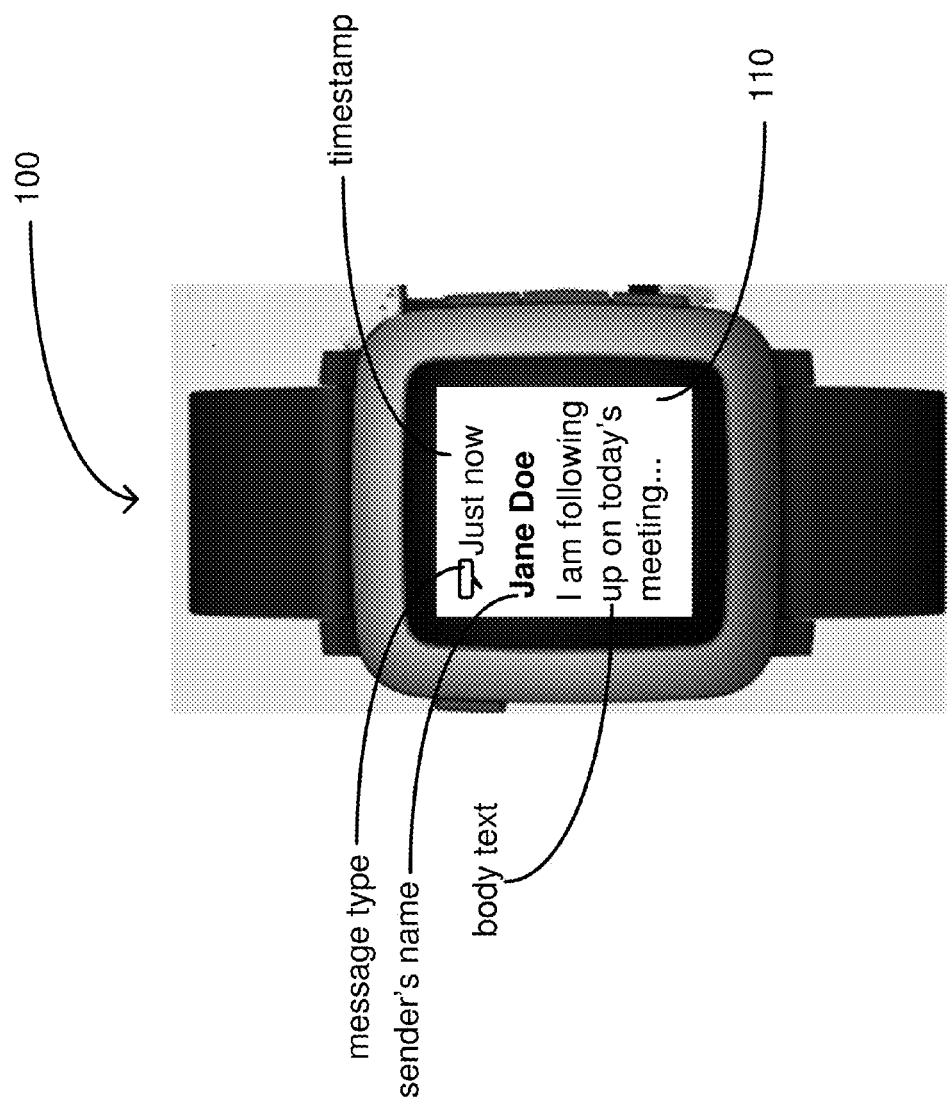
FIG. 1A illustrates a wearable electronic device showing an SMS notification in a wearable device application in accordance with some embodiments.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DESCRIPTION

In the following description, numerous specific details are set forth, such as examples of specific data signals, named components, connections, number of memory columns in a group of memory columns, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further specific numeric references such as first driver, can be made. However, the specific numeric reference should not be interpreted as a literal sequential order but rather interpreted that the first driver is different than a second driver. Thus, the specific details set forth are merely exemplary. The specific details can be varied from and still be contemplated to be within the spirit and scope of the present design. The term coupled is defined as meaning connected either directly to the component or indirectly to the component through another component.

ABBREVIATIONS

API: Application Programming Interface
SMS: Short Message Service

Due to certain limitations imposed by proprietary systems, users of wearable electronic devices might not be able to take action on SMS messages associated with the proprietary systems. Apparatuses, systems, and processes are discussed for using metadata to take action on SMS messages associated with proprietary systems.

The wearable device application, a partner mobile application, and a server module on the partner server system cooperate to use meta-data from an SMS message in order to be able to generate a reply to the sender's of the SMS message when having to go through a proprietary system located in between the electronic wearable device and the carrier of the SMS service provider. In an embodiment, the wearable device application is resident on a wearable electronic device, such as a smart watch, the partner mobile application, and the server module on the partner server system on the cloud server, all establish communications with each other and cooperate with each other to enable one or more actions such as a Reply, Delete, etc. to an SMS message from a notification of the SMS message.

A wearable device application on a wearable electronic device (e.g., smart watch) can receive an SMS notification (FIG. 1A) from an SMS-message application for an SMS message on a mobile computing device (e.g., smart phone). A user of the wearable electronic device can select a user action from within the wearable device application (FIG. 1B) such as a dismiss action or a further action, such as a get-full-message action, a reply action, a reply-to-all action, a forward action, or a delete action. If the user chooses, for example, the dismiss action, the SMS notification can be dismissed. If the user chooses, for example, a further action such as a reply action, the wearable device application can effect the user-chosen further action as provided herein.

Figure 3A:
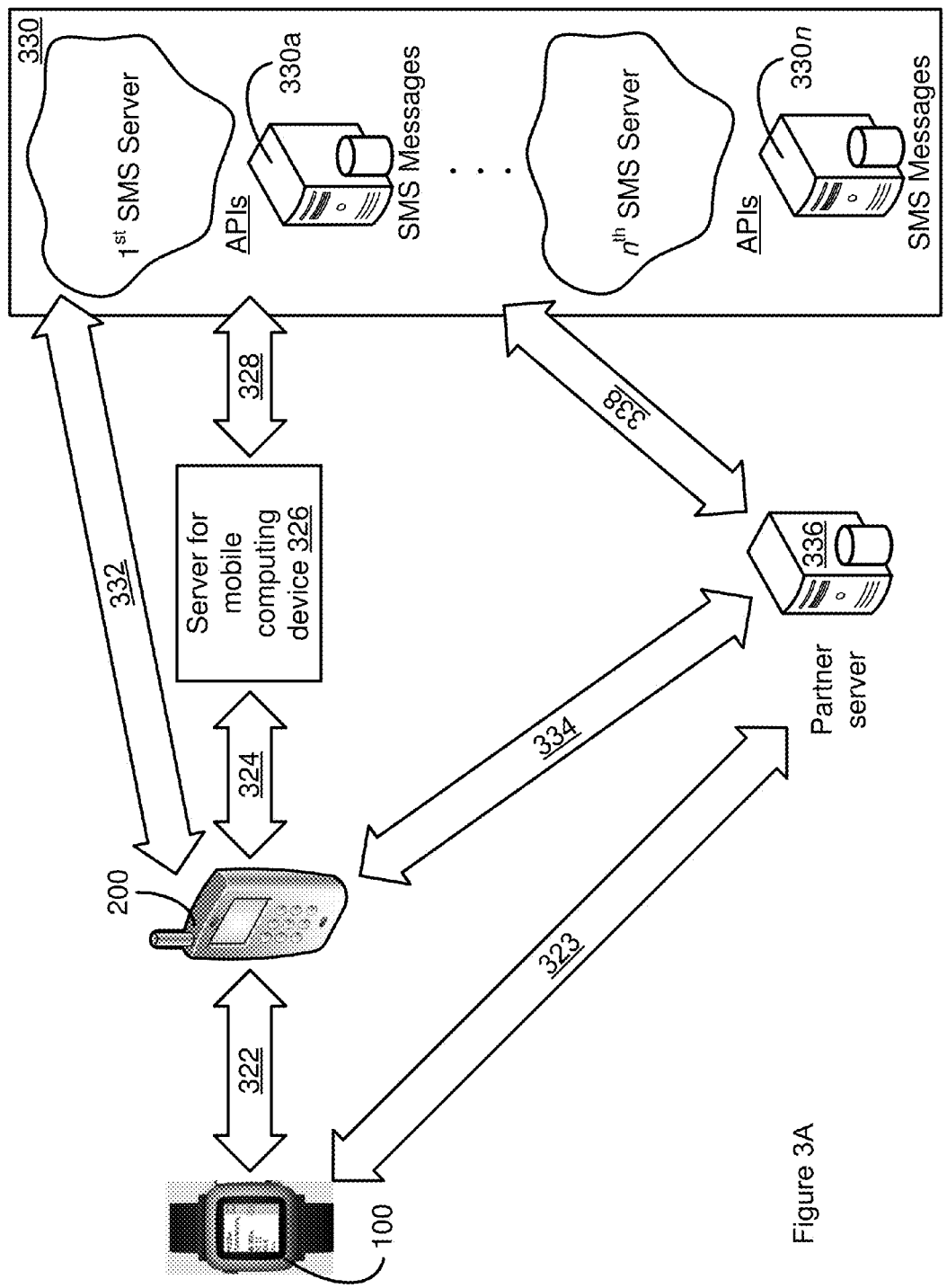
FIG. 3A illustrates communication channels for requests and responses in accordance with some embodiments.
Figure 3B:
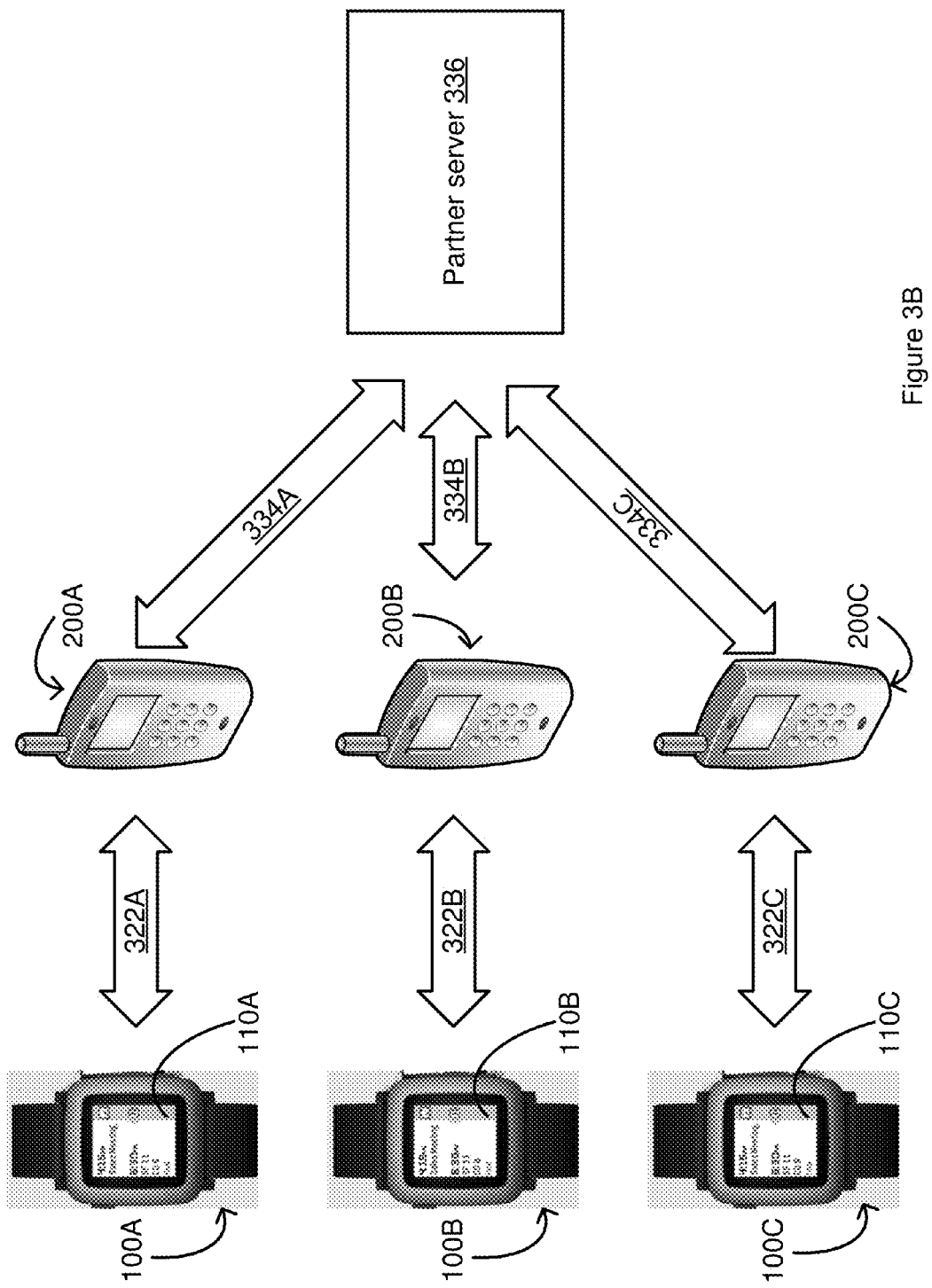
FIG. 3B illustrates communication channels for requests and responses in the system between instances of the wearable device application and the partner server in accordance with some embodiments.
Figure 3C:
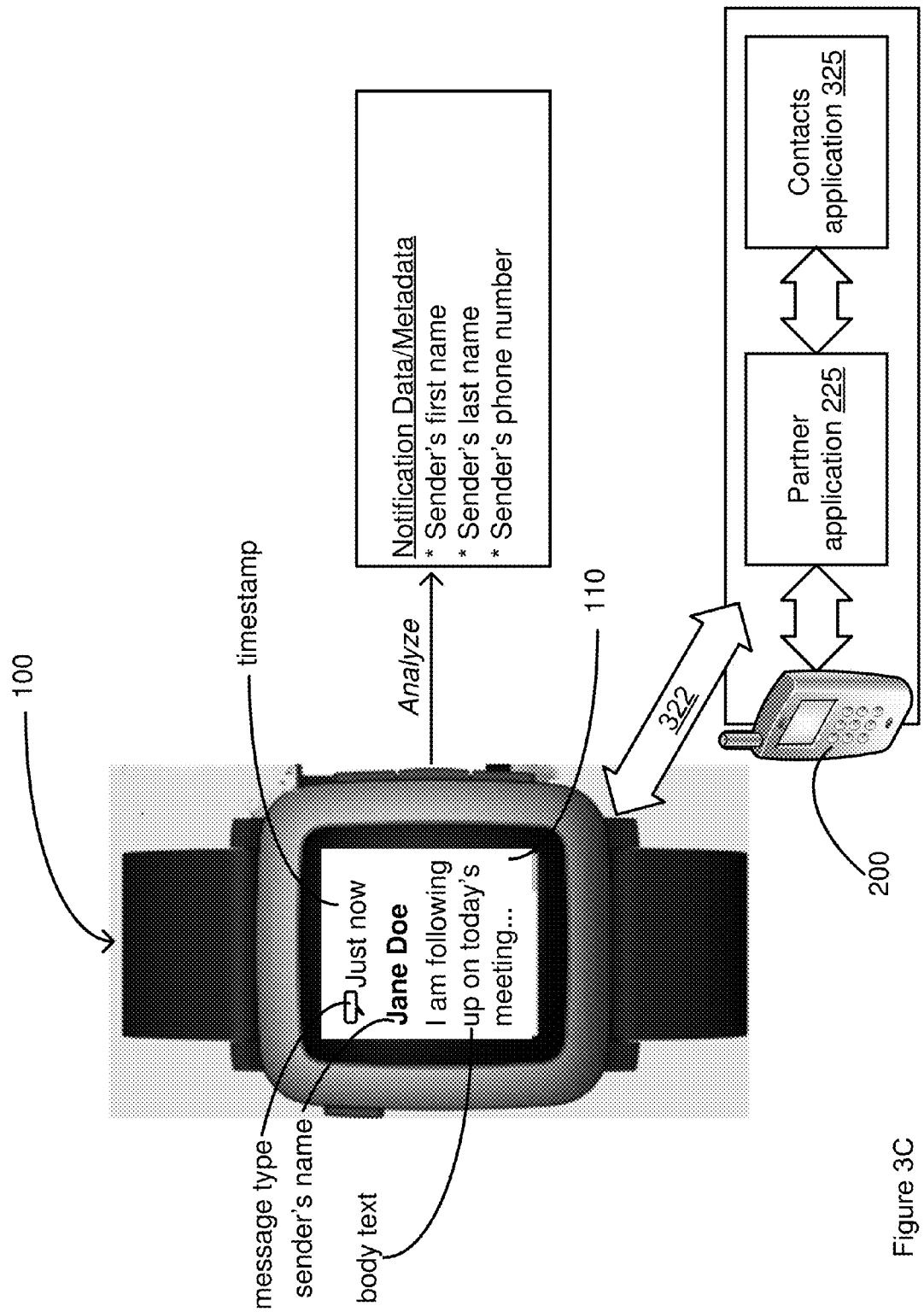
FIG. 3C illustrates analysis of an SMS notification by a wearable device application in accordance with some embodiments.

In accordance with a user-chosen further action, the wearable device application can extract a set of notification data including metadata from the SMS notification and send it to a partner application on the mobile computing device (FIG. 3C). The metadata for a potential SMS message sender can be extracted from the SMS notification, as well as metadata for other SMS message recipients if the SMS message is a group SMS message. The wearable device application can detect the potential SMS message sender of an SMS message from the SMS notification because the potential SMS message sender might be the only entity listed in the SMS notification or a header thereof. The wearable device application can detect the potential SMS message sender of a group SMS message from the SMS notification because the potential SMS message sender might be the first-listed entity in the SMS notification or the header thereof. The wearable device application can detect other SMS message recipients of the group SMS message because the other SMS message recipients might be listed in-between or following delimiters (e.g., commas, semicolons, spaces) in the SMS notification or the header thereof. If the potential SMS message sender or one of the other SMS message recipients is a group, the wearable device application can detect the group (e.g., group name) from the SMS notification or the header thereof.

The partner application can perform a reverse look-up using the metadata across various fields in a contacts application on the mobile computing device (FIGS. 3C and 4A) to create a list of potential SMS message senders, other SMS message recipients, or a combination thereof. The various fields in the contacts application can be any one or more of first name, last name, username, or phone number; however, the various fields in the contacts application are not limited to the foregoing. The reverse look-up can be used with a first database of the partner application or the mobile computing device for storing preferred contacts (e.g., contacts that are commonly used). Optionally, the preferred contacts also contains contacts not in the contacts application or on the mobile computing device. Any one or more of the preferred contacts from the first database can top the list of potential SMS message senders, other SMS message recipients, or the combination thereof.

Figure 4A:
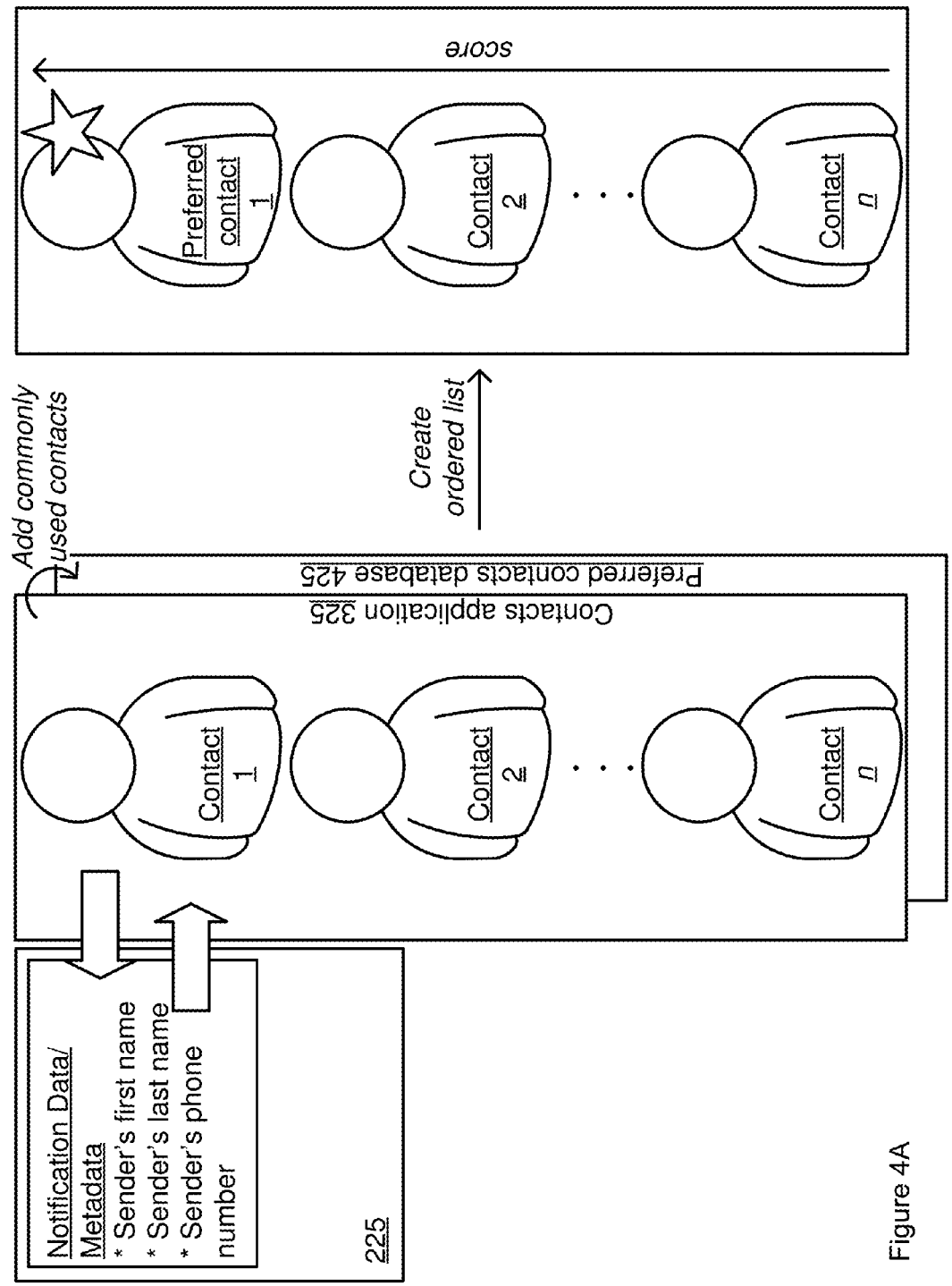
FIG. 4A illustrates ordering a list of potential SMS-message senders and/or potential additional SMS-message recipients in accordance with some embodiments.
Figure 4B:
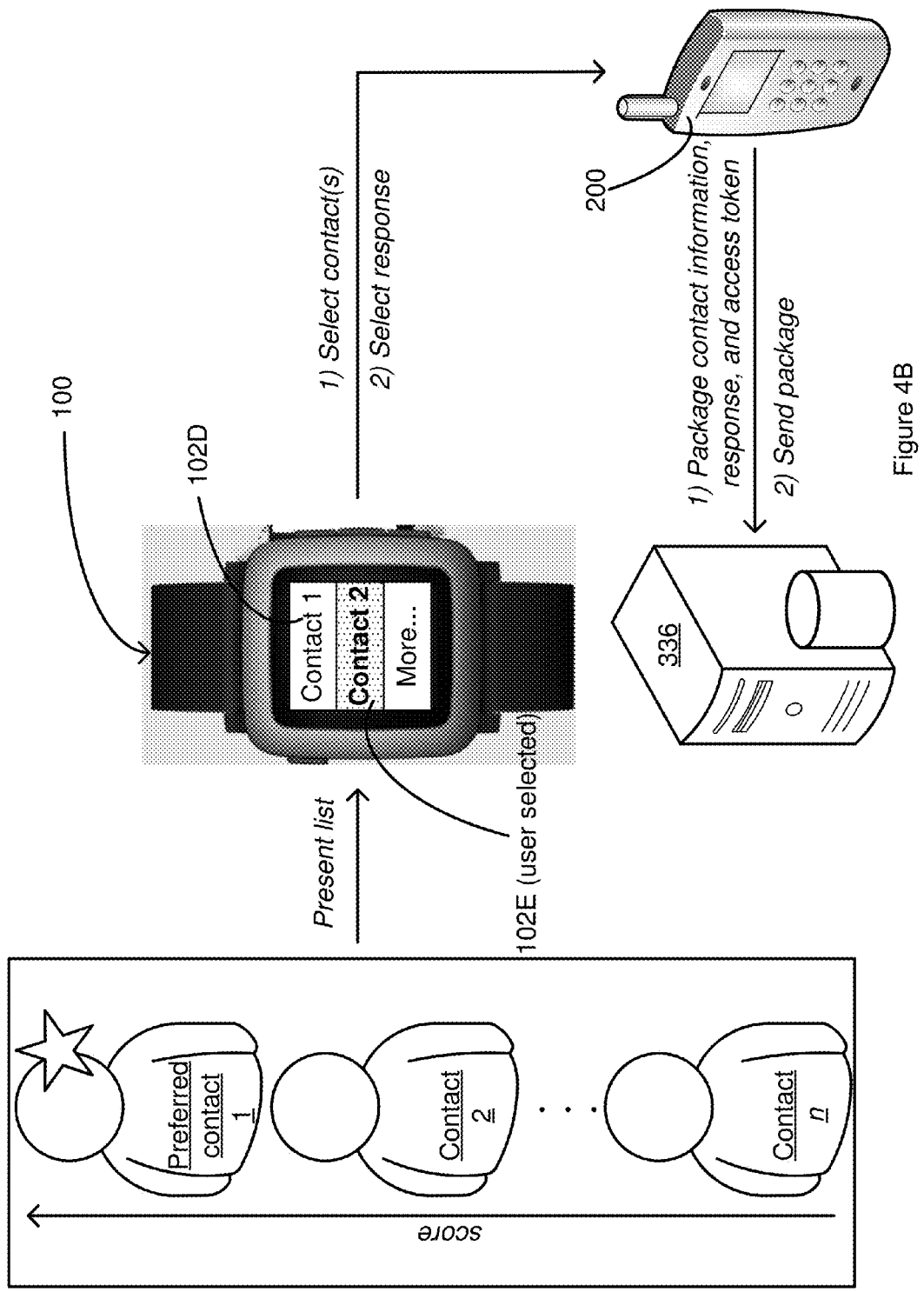
FIG. 4B illustrates a user selection of one or more potential SMS-message senders and/or one or more potential additional SMS-message recipients for an SMS message in accordance with some embodiments.

The partner application can send the list of potential SMS message senders, other SMS message recipients, or the combination thereof to the wearable device application for presentation to the user of the wearable electronic device (FIG. 4B). The user of the wearable electronic device can select one or more contacts as intended SMS-message recipients from the list of potential SMS message senders, other SMS message recipients, or the combination thereof. Optionally, the user may further select a phone number for any one or more of the contacts if more than one phone number exists for the one or more contacts.

If the user chooses, for example, a reply action (FIG. 1B), the user can select an SMS response such as a predetermined SMS response or a custom SMS response, optionally followed by entry of the custom SMS response.

The partner application can package contact information for the intended SMS-message recipients with the SMS response in a package and send the package to a partner server (FIG. 4B). The contact information in the package can include names and phone numbers for each of the intended SMS-message recipients. The package can also contain an access token for authentication (FIG. 5A), which access token is provided by the wearable device application or the partner application. The package can be encrypted or unencrypted. If the package is encrypted, the package can be decrypted by the partner server upon receipt.

Figure 4C:
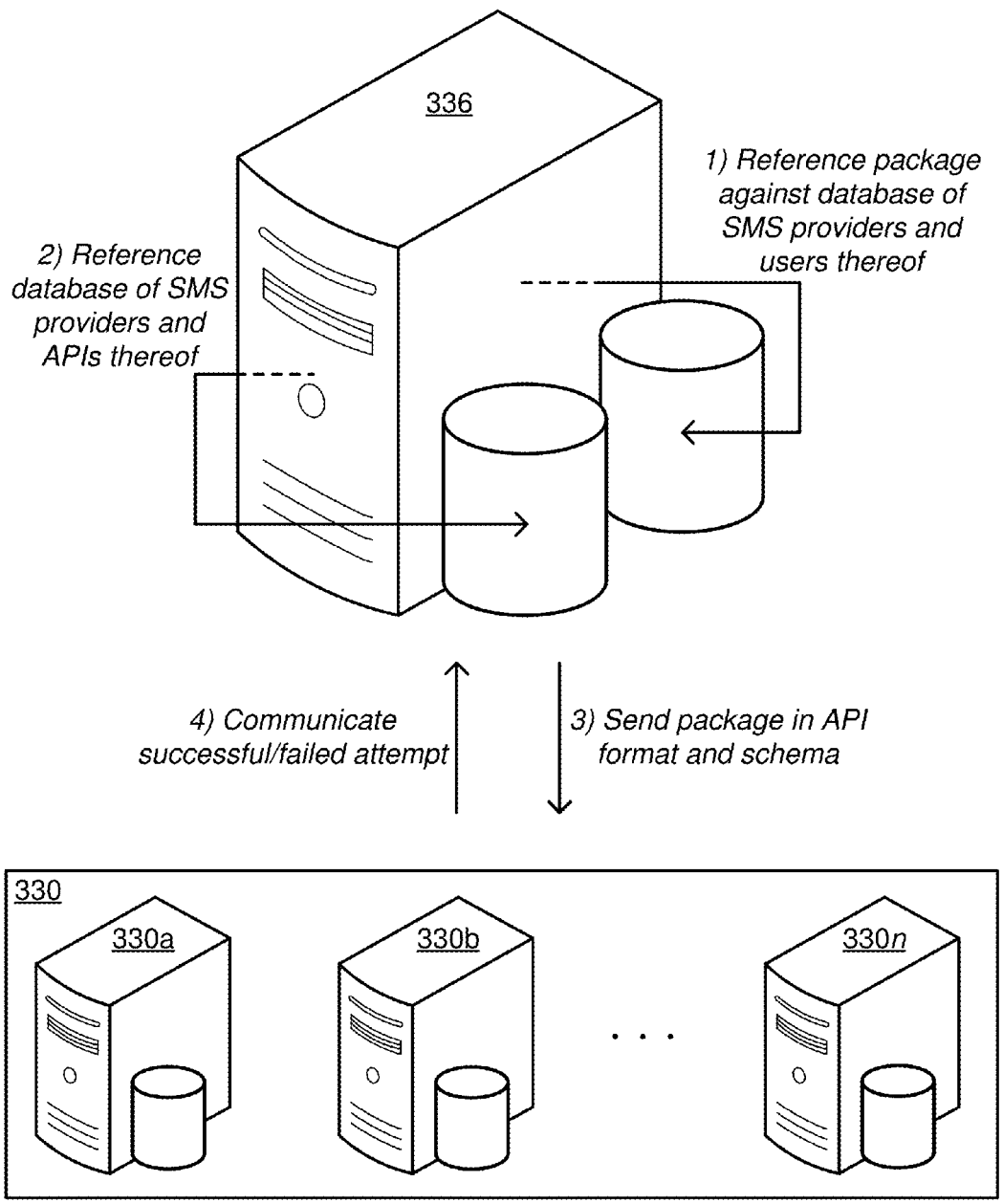
FIG. 4C illustrates sending a package with an SMS message in a schema and format required by one or more SMS service providers in accordance with some embodiments.

The partner server can reference the package with the contact information for the intended SMS-message recipients against a second database (on the partner server) of SMS providers and users serviced by the SMS providers (FIG. 4C). The partner server can subsequently determine one or more SMS providers to use for the reply action. The partner server can also utilize a web service to determine if a phone number associated with the contact information is a mobile line or a land line.

Using a third database (on the partner server) of application programming interfaces (APIs) for the SMS providers, the partner server can determine an API format and schema for each of the intended SMS-message recipients' SMS providers (FIG. 4C). The partner server can send the package with the SMS response to each of the intended SMS-message recipients' SMS providers in the API format and schema for each of the intended SMS-message recipients' SMS providers. The package can contain the access token for authentication.

Upon confirmation of receipt (e.g., success or failure) from each of the SMS providers, the partner server can confirm receipt to the mobile computing device, which, in turn, can confirm receipt to the wearable electronic device and the user thereof.

Figure 2:
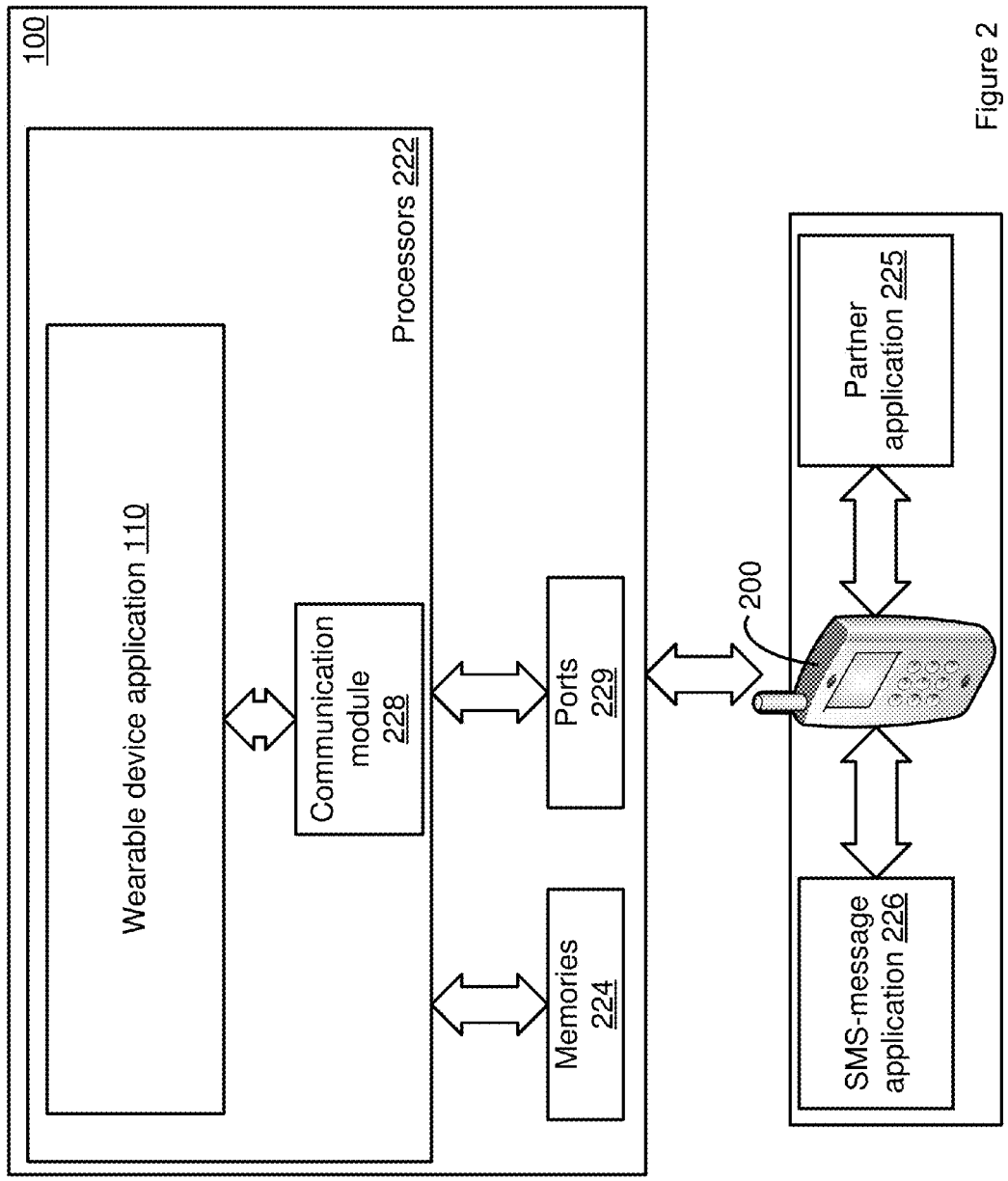
FIG. 2 illustrates a wearable electronic device in accordance with some embodiments.

FIG. 1A illustrates a wearable electronic device 100 showing an SMS notification in a wearable device application 110 in accordance with some embodiments. The SMS notification of an SMS message can be from an SMS application resident in a first memory of a mobile computing device (FIG. 2). The SMS notification can have a set of notification data such as, but not limited to, a timestamp, a sender's name, a phone number, and some body text such as the first few lines of the SMS message up to all the lines of the SMS message. Analysis of the SMS notification for an SMS message provides the notification data including its metadata, which can be incomplete with respect to the data actually present in the SMS message in its full form. As shown, the SMS notification can be displayed on a display screen of the wearable electronic device with the sender's name, some body text such as the first few lines of the SMS message, and the timestamp.

The wearable device application can present an SMS notification of an SMS message from an SMS application resident in a first memory of a mobile computing device (FIG. 2), wherein the SMS notification is displayed on a display screen of the wearable electronic device.

Figure 1B:
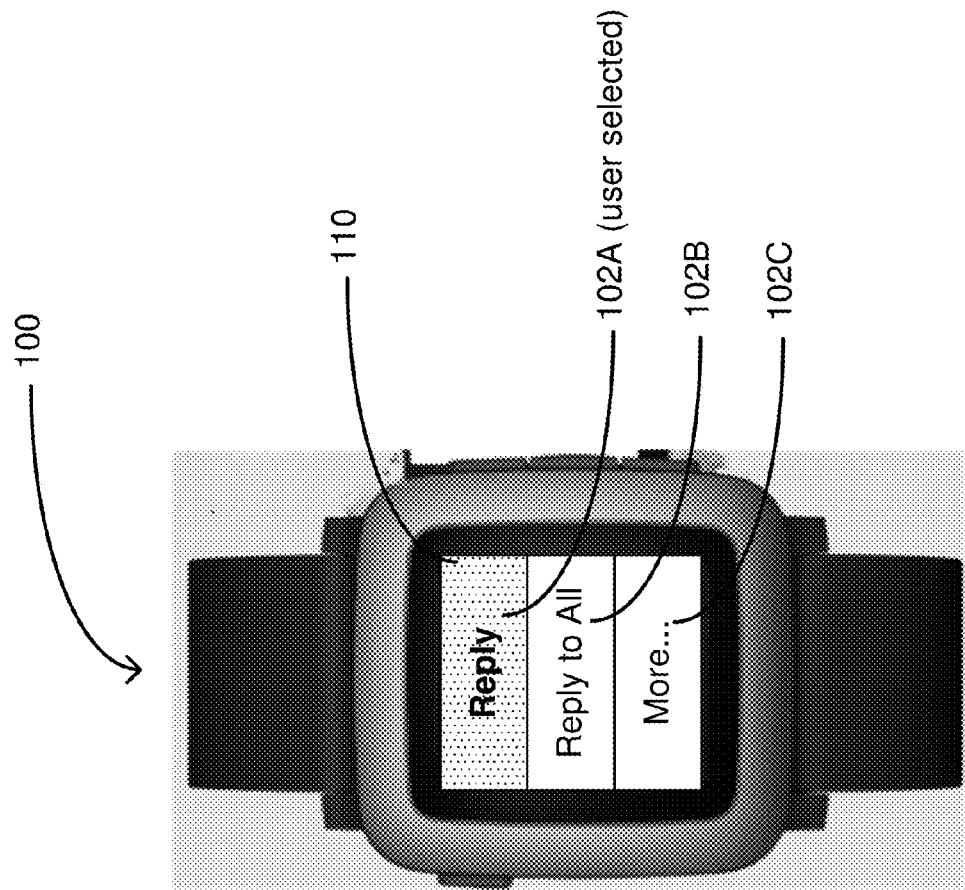
FIG. 1B illustrates a wearable electronic device showing message actions in a wearable device application in accordance with some embodiments.

FIG. 1B illustrates the wearable electronic device 100 showing message actions 102A and 102B in the wearable device application 110 in accordance with some embodiments. As shown, the wearable device application can present one or more SMS-message actions on a display screen for a user selection thereof. For example, a first selectable message action 102A corresponds to a reply action, and a second selectable message action 102B corresponds to a reply-to-all action. The wearable electronic device 100 of FIG. 1B also has a selectable navigation action 102C, which, when selected by the user, can lead the user to another interface with one or more further actions (e.g., message actions 102) such as a forward action or a delete action. The reply action in FIG. 1B is shaded to illustrate a user-selected message action.

The wearable device application can present one or more SMS-message actions on a display screen for a user selection of the one or more SMS-message actions.

FIG. 2 illustrates the wearable electronic device 100 in accordance with some embodiments. The wearable electronic device 100 can communicate, via a wireless communication circuit, with the mobile computing device 200 (e.g., smart phone) having an SMS-message application 226 and a partner application 225 resident therein. The wearable electronic device 100 has one or more processors 222 to execute instructions, memories 224 (e.g., a first memory, a second memory, etc.), or ports 229. The wearable device application can reside in a first memory of a wearable electronic device. The wearable electronic device 100 also includes a communication module 228 that can run on the processors 222 for communicating outside of the wearable electronic device 100.

The wearable device application resident in a first memory of a wearable electronic device can cooperate with one or more processors to execute instructions.

FIG. 3A illustrates communication channels for requests and responses in accordance with some embodiments. As shown, the wearable electronic device 100 can be communicatively coupled through a wireless connection 322 with the mobile computing device 200. Thus, the wearable electronic device 100 and the mobile computing device 200 can send and receive signals from each other such as requests and responses through the wireless connection 322. Additionally or alternatively, the wearable electronic device 100 can be communicatively coupled through a wireless connection 323 to a partner server 336. The wearable device application can provide the notification data from the SMS notification to a search module of the partner server over connection 323.

The mobile computing device 200 can be communicatively coupled though a number of different connections to a number of different devices and/or systems for sending and receiving signals from each other as requests and responses. In a first example of communicative coupling, the mobile computing device 200 can be communicatively coupled through a wireless or cellular connection 324 with a proprietary server 326 for the mobile computing device 200. The mobile computing device 200 may utilize a proprietary operating system or a proprietary application that passes SMS notifications to the wearable electronic device 100 but not the actual SMS message itself. The proprietary server 326, in turn, can be communicatively coupled through a connection 328 with a number of SMS-message servers 330. The connection 328 can represent more than one connection. For example, the proprietary server 326 can be communicatively coupled to a first SMS-message server 330*a* through a first connection 328A (not shown), a second SMS-message server 330*b* (FIG. 4C) through a second connection 328B (not shown), or an n*th* SMS-message server 330*n* through a second or n*th* connection 328*n* (not shown). Alternatively, in a second example of communicative coupling, the mobile computing device 200 can be communicatively coupled through a connection 332 that bypasses the proprietary server 326. Note, in an embodiment, the wearable electronic device may communicate bi-directionally with directly to the SMS server.

Due to certain limitations imposed by proprietary systems, users of wearable electronic devices such as the wearable electronic device 100 might not be able to act on incoming SMS messages when communicating through some of these communication channels. In a third example of communicative coupling, the mobile computing device 200 can be communicatively coupled through a wireless or cellular connection 334 to a partner server 336 for circumventing the limitations imposed by the proprietary systems. The partner server 336, in turn, can be communicatively coupled through a connection 338 with the number of SMS-message servers 330. Like the connection 328, the connection 338 can represent more than one connection. For example, the partner server 336 can be communicatively coupled to the first SMS-message server 330A through a first connection 338A (not shown) and the second or n*th* SMS-message server 330*n* through a second or n*th* connection 338*n* (not shown). In some embodiments, as discussed, the wearable electronic device 100 can also be communicatively coupled through a wireless or cellular connection 323 to a partner server 336.

The wearable device application can provide the notification data from the SMS notification to a search module over a wide area network, via an input circuit, on a partner server.

The wearable device application can communicate with the partner server, optionally via the partner application, in order to effect the user selection of the one or more SMS-message actions without the user needing to open and run the SMS application on the mobile computing device to effect the user selection of the one or more SMS-message actions chosen from the wearable device application.

FIG. 3B illustrates communication channels for requests and responses in the system between instances of the wearable device application 110 and the partner server 336 in accordance with some embodiments. As shown, a number of wearable electronic devices such as 100A, 100B, and 100C can be respectively communicatively coupled to a number of mobile computing devices such as 200A, 200B, and 200C through a number of wireless connections 322A, 322B, and 322C. Thus, each of the wearable electronic devices 100A, 100B, and 100C and their respective mobile computing devices 200A, 200B, and 200C can send and receive signals from each other such as requests and responses through the wireless connections 322A, 322B, and 322C. An instance of the wearable device application 110A, 110B, and 110C respectively on each of the wearable electronic devices 100A, 100B, and 100C may communicate with the partner server 336. Like the mobile computing device 200 of FIG. 3A, each of the mobile computing devices 200A, 200B, and 200C, in turn, can be communicatively coupled though a number of different connections to a number of different devices and/or systems for sending and receiving signals from each other as requests and responses. With the foregoing understanding, the mobile computing devices 200A, 200B, and 200C of FIG. 3B are simply illustrated as communicatively coupled to the partner server 336 through respective connections 334A, 334B, and 334C for circumventing the limitations imposed by the proprietary systems. Additionally or alternatively, the wearable electronic devices such as 100A, 100B, and 100C can be communicatively coupled through a wireless connection (e.g., the wireless connection 323 of FIG. 3A) to the partner server 336.

FIG. 3C illustrates analysis of an SMS notification by a wearable device application 110 in accordance with some embodiments. As provided in reference to FIG. 1A, the SMS notification can have a set of notification data such as, but not limited to, a timestamp, a sender's name, a phone number, and some body text such as the first few lines of the SMS message up to all the lines of the SMS message. The wearable device application can analyze the SMS notification and create a set of notification data derived from the SMS message. Because the notification data can be incomplete with respect to the data for the SMS message in its full form, the wearable device application 110 can retrieve missing or complementary data from a contacts application 325 (via the partner application 225) in a memory on the mobile computing device 200 through the wireless connection 322. The additional or missing data can be contact information such as one or more phone numbers or usernames for the sender and/or one or more additional recipients of the SMS message if a group SMS message.

The wearable device application can provide the notification data from the SMS notification to a partner application resident in a second memory of the mobile computing device.

The wearable device application can analyze the SMS notification and create a set of notification data that is derived from the SMS message.

FIG. 4A illustrates ordering a list of potential SMS-message senders and/or potential additional SMS-message recipients in accordance with some embodiments. As shown, the partner application 225 of the mobile computing device 200 can retrieve missing or complementary data from the contacts application 325 on the mobile computing device 200 upon request by the wearable device application 110. In addition or in an alternative to the contacts application 325, the partner application 225 can retrieve missing or complementary data from a preferred contacts database 425 having commonly used contacts, which contacts might or might not be in the contacts application 325. Once the user positively identifies a particular SMS-message sender or a particular additional SMS-message recipient (e.g., from a reverse look-up query), then the wearable device application can auto-populate information for the particular SMS-message sender or the particular additional SMS-message recipient in the future for user selection.

Upon the request by the wearable device application 110 for potential SMS-message senders and/or potential additional SMS-message recipients, the partner application 225 can compare the notification data with contact information for contacts in the contacts application 325 and/or the preferred contacts database 425, for example, in a reverse look-up query. Depending upon correspondence of the notification data to one or more contacts, the partner application 225 can order the one or more contacts in an ordered list for subsequent user selection in the wearable device application (FIG. 4B). The ordered list can be a first list with potential SMS-message senders, a second list of one or more potential additional SMS-message recipients, or a combination of the first list and the second list.

For example, the partner application 225 can compare notification data such as the sender's first name; the sender's last name; the sender's full name; the sender's username; the sender's phone number; the additional recipient's first name; the additional recipient's last name; the additional recipient's full name; the additional recipient's username; or the additional recipient's phone number. As shown in FIG. 4A, the partner application 225 can compare notification data such as the sender's first name, the sender's last name, and the sender's phone number against contact information for contacts in the contacts application 325 represented by Contact 1 and Contact 2 through Contact n. While not shown, the preferred contacts database 425 can likewise contain Preferred Contact 1 and Preferred Contact 2 through Preferred Contact n, and the partner application 225 can compare the notification data against contact information for the preferred contacts as well. Continuing with the example shown in FIG. 4A, due to a strong correspondence of the notification data to Preferred Contact 1 from the preferred contacts database 425 followed by Contact 2 from the contacts application 325, the ordered list created by the partner application 225 has Preferred Contact 1 on top of the list followed by Contact 2. Lesser ranked contacts from the contacts application 325 and the preferred contacts database 425 are represented by contacts leading up to Contact n in the ordered list.

The partner application (or the search module in some embodiments) can perform a reverse look-up query using the notification data in one or more fields of a contacts list of a user of the wearable electronic device. The partner application (or the search module in some embodiments) can construct a first list with potential SMS-message senders derived from search results of the reverse look-up query. The partner application can construct a second list with potential additional SMS-message recipients derived from search results of the reverse look-up query. Optionally, the first list and the second list can be combined.

The notification data queried in the one or more fields is selected from the group consisting of a sender's first name; the sender's last name; the sender's full name; the sender's username; the sender's phone number; an additional recipient's first name; the additional recipient's last name; the additional recipient's full name; the additional recipient's username; and the additional recipient's phone number.

The partner application can store the user selection of the one or more potential SMS-message senders and the user selection of the one or more potential additional SMS-message recipients in a preferred list for the reverse look-up query, so that once the user positively identifies a particular SMS-message sender or a particular additional SMS-message recipient with the reverse look-up query using the notification data, then the wearable device application can auto-populate information for the particular SMS-message sender or the particular additional SMS-message recipient in the future.

FIG. 4B illustrates a user selection of one or more potential SMS-message senders and/or one or more potential additional SMS-message recipients in accordance with some embodiments. If the user of the wearable electronic device 100 receives the SMS notification of FIG. 1A and selects the message action 102A (e.g., reply) of FIG. 1B, then the wearable device application 110 can request the partner application 225 on the mobile computing device 200 to retrieve missing or complementary data from the contacts application 325 or the preferred contacts database 425 and create the ordered list of FIG. 4A. Continuing with the example, the wearable device application 110 can receive the ordered list of one or more potential SMS-message senders and/or one or more potential additional SMS-message recipients from the partner application and present the ordered list to the user in one or more user interfaces on the wearable electronic device 100. As shown, a first contact selection 102D corresponds to Contact 1 (e.g., Preferred Contact 1 from the ordered list), and a second contact selection 102E corresponds to Contact 2 (e.g., Contact 2 from the ordered list). The second contact selection 102E in FIG. 4B is shaded to illustrate the user selection of the second contact selection 102E for the potential SMS-message sender or the potential additional SMS-message recipient. It should be understood that the wearable device application 110 can successively present the contacts of the ordered list to the user until the user finishes selecting contacts and dismisses the ordered list or until the wearable device application 110 finishes presenting the entire ordered list.

As shown in FIG. 4B, subsequent to the user's selection of one or more contacts from the ordered list presented in the one or more interfaces of the wearable device application 110, the user can select a response corresponding to one of the previously selected message actions 102. Continuing with the foregoing example, if the user of the wearable electronic device 100 receives the SMS notification of FIG. 1A and selects the message action 102A (e.g., reply) of FIG. 1B, then the wearable device application 110 can present a number of predetermined SMS-message responses and/or previously created SMS-message responses from which the user can select at least one SMS-message response. The wearable device application 110 can send the user selection of the message action (e.g., the message action 102A corresponding to reply), the user selection of intended SMS-message recipients selected from the one or more potential SMS-message senders and/or one or more potential additional SMS-message recipients (e.g., the second contact selection 102E corresponding to Contact 2), and the user selection of the SMS-message response to the partner application 225 on the mobile computing device 200. The partner application 225, in turn, can package the foregoing user selections in a package with an access token that potentially includes additional authorization credentials for authorization to the user's SMS account and send the package to the partner server 336.

The wearable device application can communicate with the partner server via the partner application, receive the first list from the partner application, and present a user interface with the first list to the user for a user selection of one or more of the potential SMS-message senders. The wearable device application can store the user's selection the one or more of the potential SMS-message senders from the first list to assist in retrieving the SMS-message and effect the user selection of the one or more SMS-message actions chosen from the wearable device application.

The wearable device application can receive the ordered list from the partner application and present the ordered list to the user for a user selection of one or more of the potential SMS-message senders and/or one or more of the potential additional SMS-message recipients.

The wearable device application can construct a query with terms including the one or more potential SMS message senders, along with other metadata including a time stamp of the SMS message and an access token for the user's SMS account to the SMS provider to retrieve the SMS-message from an appropriate SMS server. In an embodiment, the wearable device application merely sends the meta data to the partner application on the mobile device and then the partner application on the mobile device constructs the package with the query terms and access token.

The wearable device application can send the user selection of the one or more SMS-message actions, content supplied by the user in response to the SMS message, the user selection of the one or more potential SMS-message senders and/or the one or more of potential additional SMS-message recipients as intended recipients, and an access token for the SMS provider in order to effect the user selection of the one or more SMS-message actions without the user of the wearable electronic device needing to open and run the SMS application on the mobile computing device. In an embodiment, the partner application on the mobile device sends the user selection of the one or more SMS-message actions, content supplied by the user in response to the SMS message, the user selection of the one or more potential SMS-message senders and/or the one or more of potential additional SMS-message recipients as intended recipients, and an access token for the SMS provider to the backend server.

As illustrated in FIG. 4B, the partner application can package the user selection of the one or more SMS-message actions, the user selection of the one or more potential SMS-message senders and/or the one or more of potential additional SMS-message recipients as intended recipients, the access token, and the content supplied by the user in response to the SMS message in a package and provide the package in to the partner server.

In an embodiment, the wearable device application is configured to provide users a way to reply to an incoming SMS or iMessage. The wearable device application is configured to work with the server module on the partner server that is configured to integrate with one or more application programming interfaces of one or more SMS service providers. The server module is configured to receive data from the electronic wearable device and then format and translate the data of the text message into the format and schema of the application programming interface of each SMS service provider.

FIG. 4C illustrates sending a package with an SMS message in a schema and format required by one or more SMS service providers in accordance with some embodiments. The partner server 336 or a module thereof can reference the package of user selections including the intended SMS-message recipients against an SMS-provider database on the partner server 336 of SMS providers and users serviced by the SMS providers. Once the partner server 336 or the module thereof determines one or more SMS providers to use, the partner server 336 or another module thereof (e.g., an API module) can reference an API database on the partner server 336 of APIs for the one or more SMS providers. The partner server 336 can subsequently determine a schema and format required by an API for each of the intended SMS-message recipients' SMS providers. The partner server 336 can send the package with the user selection of the SMS-message response to each of the intended SMS-message recipients' SMS providers in the schema and format required by the API for each of the intended SMS-message recipients' SMS providers. The package can contain the access token (e.g., an encrypted access token) for authentication. Subsequent to the partner server 336 sending the package with the user selection of the SMS-message response to each of the intended SMS-message recipients at the one or more of the SMS-message servers 330 (e.g., the SMS-message servers 330a, 330b . . . 330n), the partner server can receive communications from the SMS-message servers 330 regarding successful/failed attempts at sending the package. The successful/failed attempts can be relayed to the wearable device application on the wearable electronic device, optionally via the partner application on the mobile computing device.

The partner server can reference the package against an SMS-provider database of SMS providers and users serviced by the SMS providers and determine one or more of the SMS providers to use in order to effect the user selection of the one or more SMS-message actions.

The partner server can access a second database of APIs for the SMS providers, put the package into the schema and format required by the API for each of the SMS providers needed in order to effect the user selection of the one or more SMS-message actions, and send the package to each of the foregoing SMS providers.

The partner server can communicate a successful or failed attempt to effect the user selection of the one or more SMS-message actions to the wearable device application via the partner application.

In an embodiment, one or more of the phone carriers have their own web based SMS authentication flow (Auth flow), where the user either i) clicks 'Accept' to giving the wearable device application permission to send SMS messages on their behalf or ii) is asked to text message a code to an AT&T owned number (the two scenarios are based on if user is on WiFi or AT&T data network).

Figure 5A:
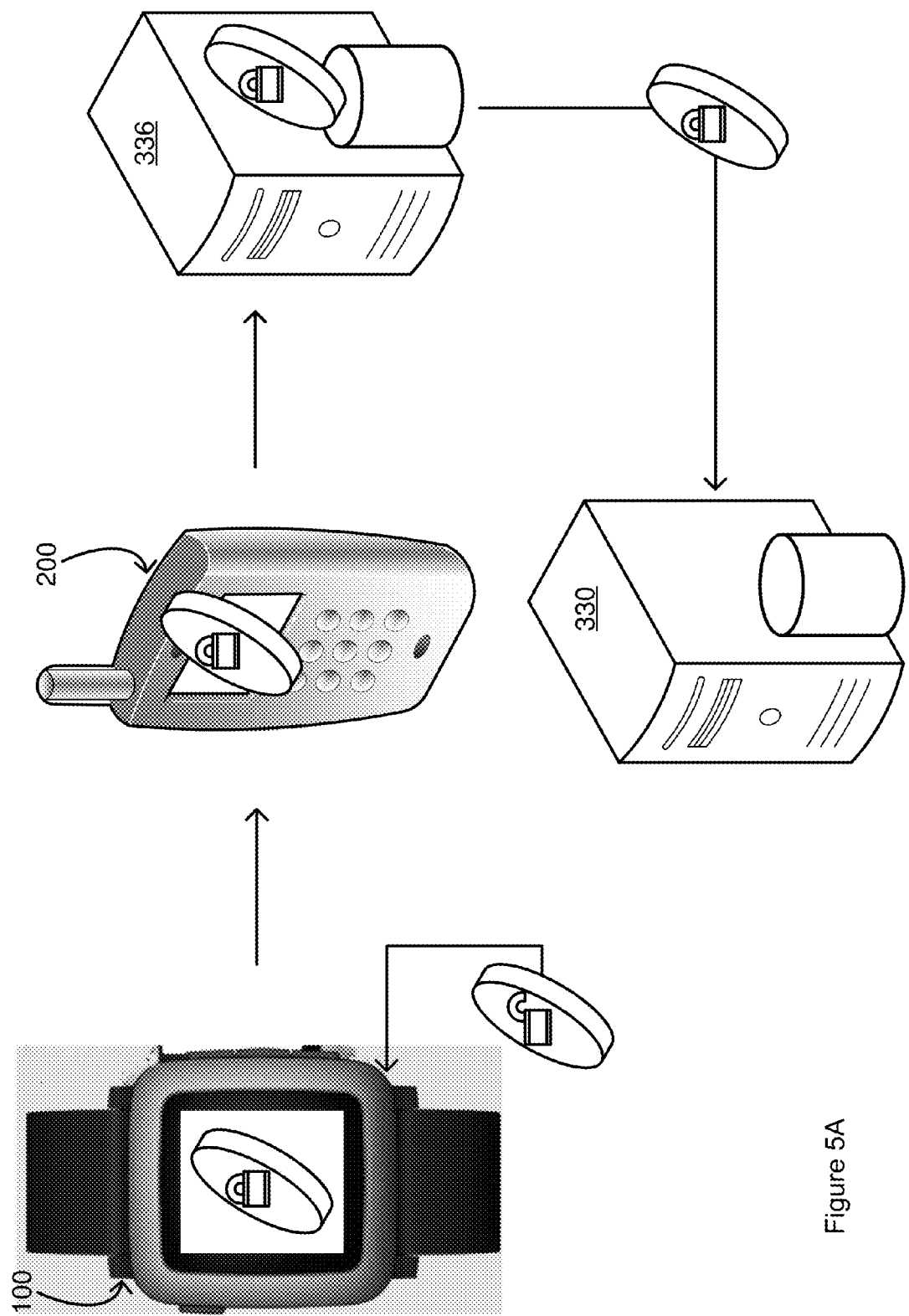
FIG. 5A illustrates access token encryption and decryption in accordance with some embodiments.

FIG. 5A illustrates access token encryption and decryption in accordance with some embodiments. In an embodiment, the backend server can encrypt an access token for authorization to a user's SMS account to provide an encrypted access token for the SMS-message account on an SMS-message server. A first security algorithm can encrypt the access token and store it in the first memory of the backend server. The communication circuit of the backend server can send the encrypted access token to a partner application resident on a mobile device. The access token including other user credentials such as a password and user account name are stored in an encrypted form in the memory of the mobile device.

The wearable device application 110 can send the user's selection of the message action (e.g., the message action 102A corresponding to reply), the user's selection of intended SMS-message recipients (e.g., the second contact selection 102E corresponding to Contact 2), and the user's selection of the SMS-message response to the partner application 225 on the mobile computing device 200 through the wireless connection 322 (FIG. 3A).

The mobile computing device 200 can, in turn, send the package with the encrypted access token to the partner server 336 through the wireless or cellular connection 324 (FIG. 3A). Having securely transmitted the access token to the partner server 336, the partner server 336 can provide an encrypted access token for use with the SMS-message account on the SMS-message server. As provided in FIG. 4C, the partner server 336 may provide the encrypted access token in the foregoing package in the format and schema associated with the API needed to access and communicate with the SMS-message account on the SMS-message server.

A first security algorithm can store the access token as an encrypted access token in the first memory of the wearable electronic device.

Figure 5B:
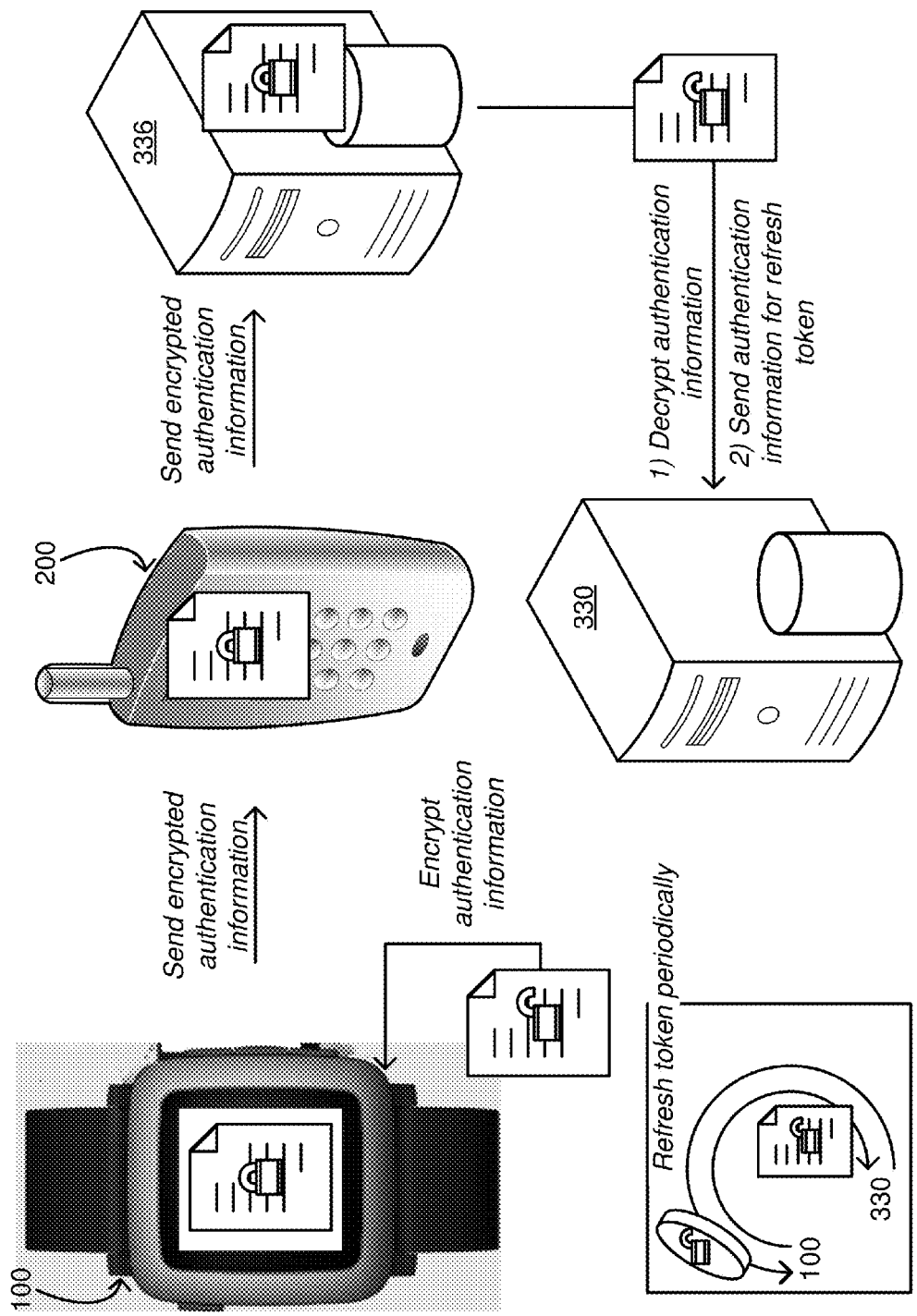
FIG. 5B illustrates authentication information encryption and decryption in accordance with some embodiments.

FIG. 5B illustrates authentication information encryption and decryption in accordance with some embodiments. As shown, the wearable electronic device 100, a module thereof (e.g., the wearable device application 110), or a security algorithm thereof can encrypt user authentication information for an SMS-message account on an SMS-message server as encrypted authentication information on the wearable electronic device 100. The encrypted authentication information can be stored in a memory of the wearable electronic device or the mobile computing device. On a periodic basis (e.g., every two days), the wearable electronic device 110 can send the encrypted authentication information to the partner application 225 on the mobile computing device 200 through the wireless connection 322 (FIG. 3A). The mobile computing device 200 can, optionally or in turn, send the encrypted authentication information to the partner server 336 through the wireless or cellular connection 324 (FIG. 3A). Having securely transmitted the authentication information to the partner server 336, the partner server 336 can decrypt the authentication information, analyze the authentication information to determine the proper SMS carrier to access, and then send encrypted authentication information to the SMS-message server for a refresh token for the SMS-message account. Authentication processes such as two or more authentication processes can be indexed and stored in an authentication database that cooperates with an authentication module on the partner server.

A first security algorithm can store user-provided authentication information as encrypted data in the first memory of the wearable electronic device or the second memory of the mobile computing device.

A first routine can periodically refresh the access token from the SMS provider by periodically supplying the user-provided authentication information stored on the backend server, or on the wearable electronic device or on the mobile computing device in an encrypted form to one or more SMS-message servers. The partner server has an authentication module that can reference SMS-provider authentication processes to obtain access tokens. At least two or more authentication processes are indexed and stored in an authentication database that cooperates with the authentication module on the partner server.

Figure 5C:
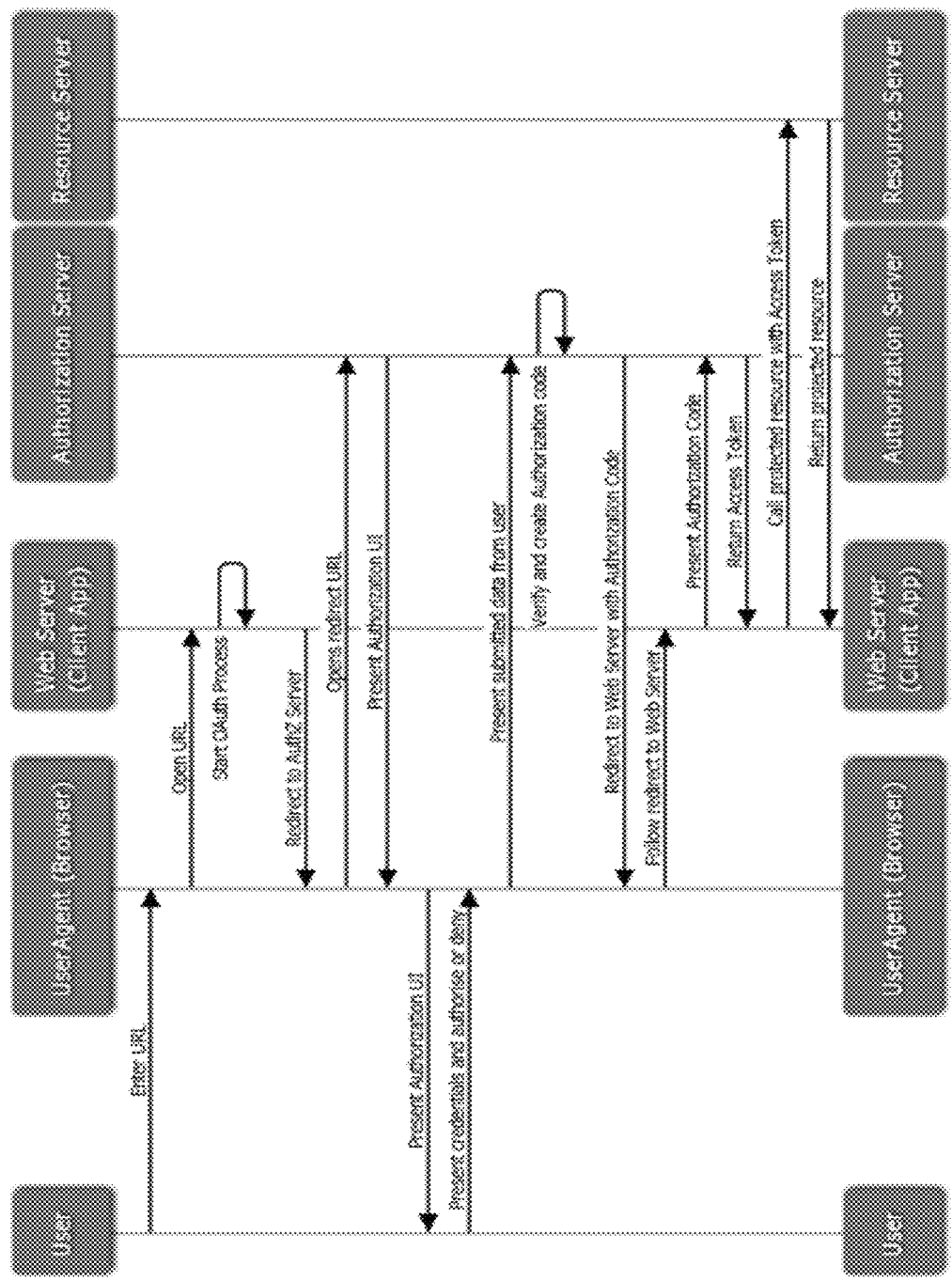
FIG. 5C illustrates authentication and authorization using an example authorization protocol in accordance with some embodiments.

FIG. 5C illustrates authentication and authorization using an example authentication protocol, such as the OAuth 2.0 protocol, in accordance with some embodiments.

Figure 6:
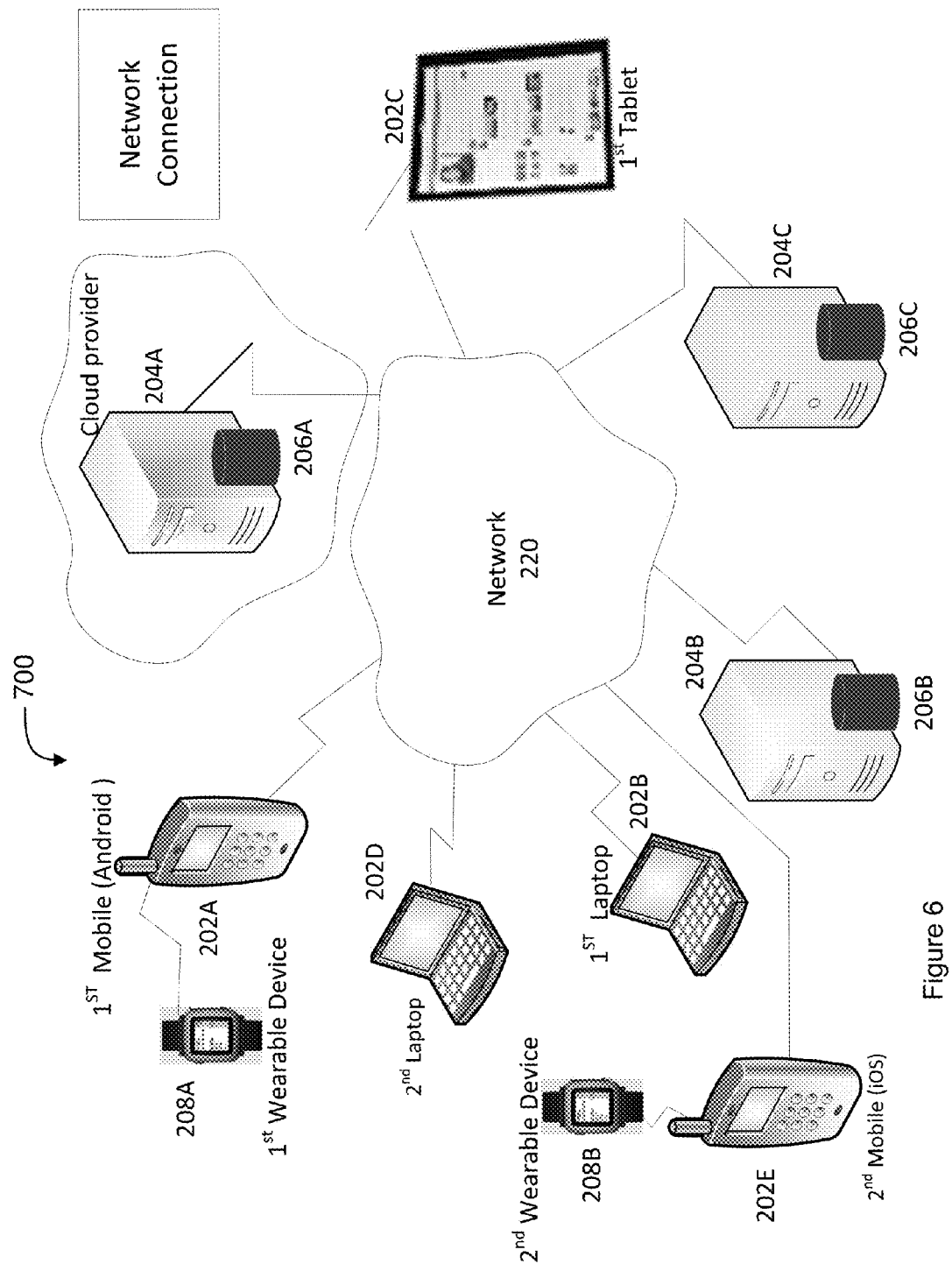
FIG. 6 illustrates remote access and/or communication by a wearable electronic device to other devices on a network in accordance with some embodiments.
Figure 7:
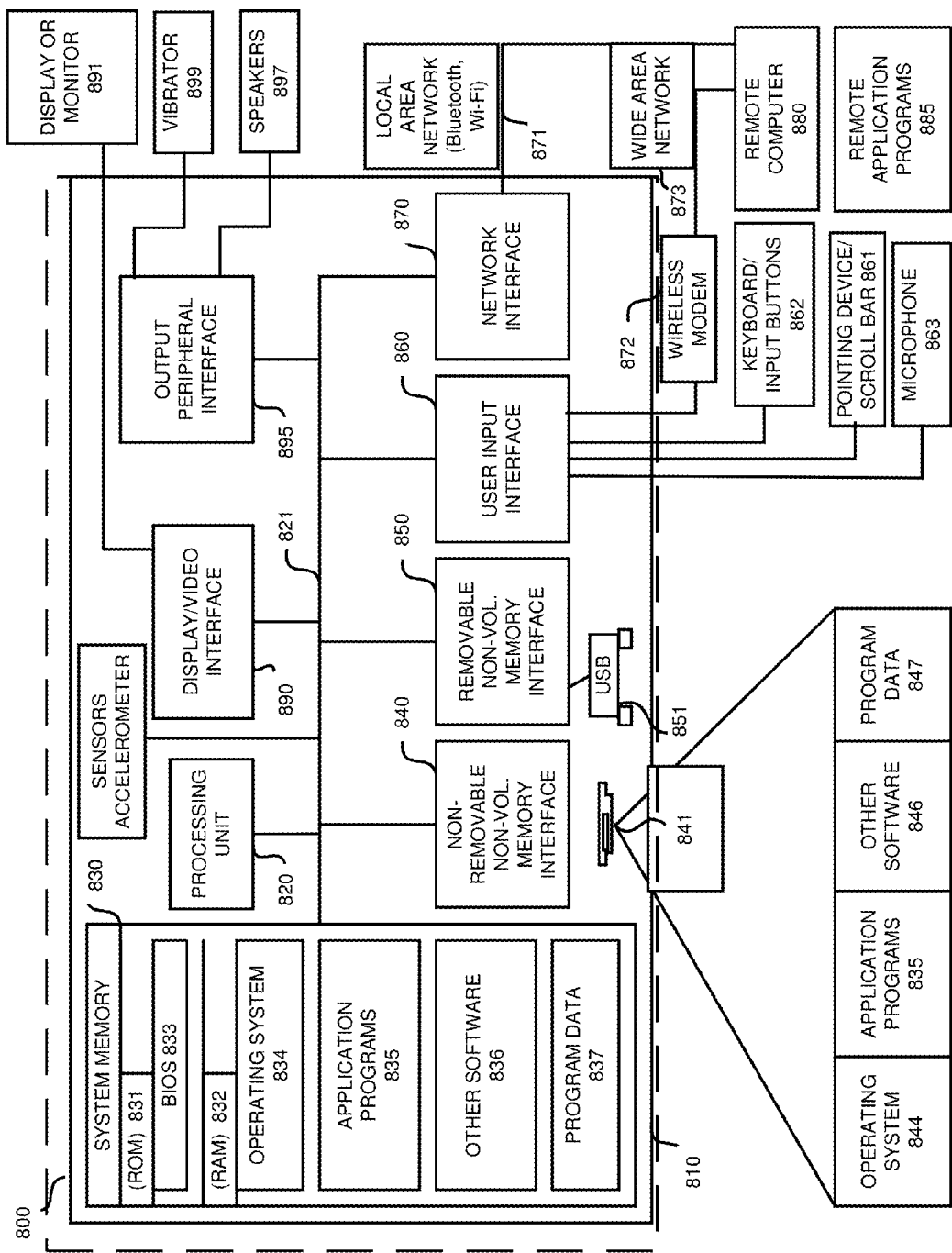
FIG. 7 illustrates a computing system that can be part of one or more of the wearable electronic devices in accordance with some embodiments.

In general, the wearable electronic device includes one or more systems and can be coupled to one or more networks. FIGS. 6 and 7 illustrate additional example environments to implement the concepts.

FIG. 6 illustrates remote access and/or communication by a wearable electronic device to other devices on a network in accordance with some embodiments. The network environment 700 has a communications network 220 that connects server computing systems 204A through 204C, and at least one or more client computing systems 202A to 202F. As shown, there may be many server computing systems 204A through 204C and many client computing systems 202A to 202F connected to each other via the network 220, which may be, for example, the Internet. Note, that alternatively the network 220 might be or include one or more of: an optical network, a cellular network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 202A and the server computing system 204A can both initiate and respond to communications, their communication may be viewed as peer-to-peer. Likewise, communications between the server computing systems 204A and 204-B, and the client computing systems 202A and 202C may be viewed as peer-to-peer if each such communicating device is capable of initiation and response to communication. Additionally, server computing systems 204A-204C also have circuitry and software to communication with each other across the network 220. One or more of the server computing systems 204A to 204C may be associated with a database such as, for example, the databases 206A to 206C. Each server may have one or more instances of a virtual server running on that physical server and multiple virtual instances may be implemented by the design. A firewall may be established between a client computing system 202C and the network 220 to protect data integrity on the client computing system 202C. Each server computing system 204A-204C may have one or more firewalls.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicate use of these resources. The user's cloud-based site is given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

The cloud-based remote access is coded to utilize a protocol, such as Hypertext Transfer Protocol (HTTP), to engage in a request and response cycle with both a mobile device application resident on a client device as well as a web-browser application resident on the client device. The cloud-based remote access for a wearable electronic device, can be accessed by a mobile device, a desktop, a tablet device, and other similar devices, anytime, anywhere. Thus, the cloud-based remote access to a wearable electronic device hosted on a cloud-based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud-based remote access to a wearable electronic device, and 5) combinations of these.

In an embodiment, the server computing system 204A may include a server engine, a page management component or other network user interface component, such as a mobile application or wearable device application managing component, a content management component, and a database management component. The server engine performs basic processing and operating system level tasks. The page management component handles creation and display or routing of web pages or other interface screens associated with receiving and providing digital content and/or digital advertisements. Users may access the server-computing device by means of a URL associated therewith. The content management component handles most of the functions in the embodiments described herein. The database management component includes storage and retrieval tasks with respect to the database, queries to the database, and storage of data.

An embodiment of a server computing system to display information, such as a web page, etc. is discussed. An application including any program modules, apps, services, processes, and other similar software executable when executed on the server computing system 204A, causes the server computing system 204A to display windows and user interface screens on a portion of a media space, such as a web page. A user from the client computing system 202A may interact with the web page, and then supply input to the query/fields and/or service presented by a user interface of the application. The page may be served by a server computing system 204A on any Hypertext Markup Language (HTML) or Wireless Access Protocol (WAP) enabled client computing system 202A or any equivalent thereof. For example, the client mobile computing system 202A may be a wearable electronic device, smart phone, a touch pad, a laptop, a netbook, etc. The client computing system 202A may host a browser to interact with the server computing system 204A. Each application has a code scripted to perform the functions that the software component is coded to carry out such as presenting fields and icons to take details of desired information. Algorithms, routines, and engines within the server computing system 204A take the information from the presenting fields and icons and put that information into an appropriate storage medium such as a database. A comparison wizard is scripted to refer to a database and make use of such data. The applications may be hosted on the server computing system 204A and served to the browser of the client computing system 202A. The applications then serve pages that allow entry of details and further pages that allow entry of more details.

FIG. 7 illustrates a computing system that can be part of one or more of the wearable electronic devices in accordance with some embodiments. With reference to FIG. 7, components of the computing system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

Computing system 810 typically includes a variety of computing machine-readable media. Computing machine-readable media can be any available media that can be accessed by computing system 810 and includes both volatile and nonvolatile media, removable and non-removable media. By way of example, and not limitation, computing machine-readable mediums uses include storage of information, such as computer readable instructions, data structures, other executable software or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computing device 800. Transitory media such as wireless channels are not included in the machine-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computing system 810, such as during start-up, is typically stored in ROM 831. RAM 832 typically contains data and/or software that are immediately accessible to and/or presently being operated on by processing unit 820. By way of example, and not limitation, FIG. 7 illustrates that RAM can include a portion of the operating system 834, other executable software 836, and program data 837.

The computing system 810 may also include other removable/non-removable volatile/nonvolatile computer storage media. By way of example only, FIG. 7 illustrates a solid-state memory 841. Other removable/non-removable, volatile/nonvolatile computer storage media that can be used in the exemplary operating environment include, but are not limited to, USB drives and devices, flash memory cards, solid state RAM, solid state ROM, and the like. The solid-state memory 841 is typically connected to the system bus 821 through a non-removable memory interface such as interface 840, and USB drive 851 is typically connected to the system bus 821 by a removable memory interface, such as interface 850.

As an example, the computer readable storage medium 841 stores Operating System software for smart watches to cooperate with both Android OS and iOS.

The drives and their associated computer storage media discussed above and illustrated in FIG. 7, provide storage of computer readable instructions, data structures, other executable software and other data for the computing system 810. In FIG. 7, for example, the solid state memory 841 is illustrated for storing operating system 844, other executable software 846, and program data 847. Note that these components can either be the same as or different from operating system 834, other executable software 836, and program data 837. Operating system 844, other executable software 846, and program data 847 are given different numbers here to illustrate that, at a minimum, they are different copies. In an example, the operating system, Pebble OS, can be a customized Free RTOS kernel that can communicate with Android and iOS apps using Bluetooth, Wi-Fi, cellular or other communication methodology.

A user may enter commands and information into the computing system 810 through input devices such as a keyboard, touchscreen, or even push button input component 862, a microphone 863, a pointing device and/or scrolling input component 861, such as a mouse, trackball or touch pad. The microphone 863 may cooperate with speech recognition software. These and other input devices are often connected to the processing unit 820 through a user input interface 860 that is coupled to the system bus, but may be connected by other interface and bus structures, such as a parallel port, game port or a universal serial bus (USB). A display monitor 891 or other type of display screen device is also connected to the system bus 821 via an interface, such as a display and video interface 890. In addition to the display monitor, computing devices may also include other peripheral output devices such as speakers 897, a vibrator 899, and other output device, which may be connected through an output peripheral interface 890.

The computing system 810 may operate in a networked environment using logical connections to one or more remote computers/client devices, such as a remote computing device 880. The remote computing device 880 may be a wearable electronic device, a personal computer, a handheld device, a server, a router, a network PC, a peer device or other common network node, and typically includes many or all of the elements described above relative to the computing system 810. The logical connections depicted in FIG. 7 include a local area network (LAN) 871 and a wide area network (WAN) 873, but may also include other networks. Such networking environments are commonplace in offices, enterprise-wide computer networks, intranets and the Internet. A browser application as well as other applications may be resident on the computing device and stored in the memory.

It should be noted that the present design can be carried out on a computing system such as that described with respect to FIG. 7. However, the present design can be carried out on a server, a computing device devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless communication module 872 may employ a Wireless Application Protocol to establish a wireless communication channel. The wireless communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

FIGS. 9A and 9B respectively illustrate methods 900A and 900B for taking action on SMS notifications using an incomplete data set regarding a notification from within the wearable device application in accordance with some embodiments. The methods and the steps thereof can be performed out of literal order when logically possible. Data and routines of the methods can be stored on any combination of a memory of the wearable electronic device 100, the mobile computing device 200, the partner server 336, or one or more of the SMS-message servers 330. The steps of the methods can be executed on any combination of the wearable electronic device 100, the mobile computing device 200, the partner server 336, or one or more of the message servers 330 when logically possible.

Figure 8A:
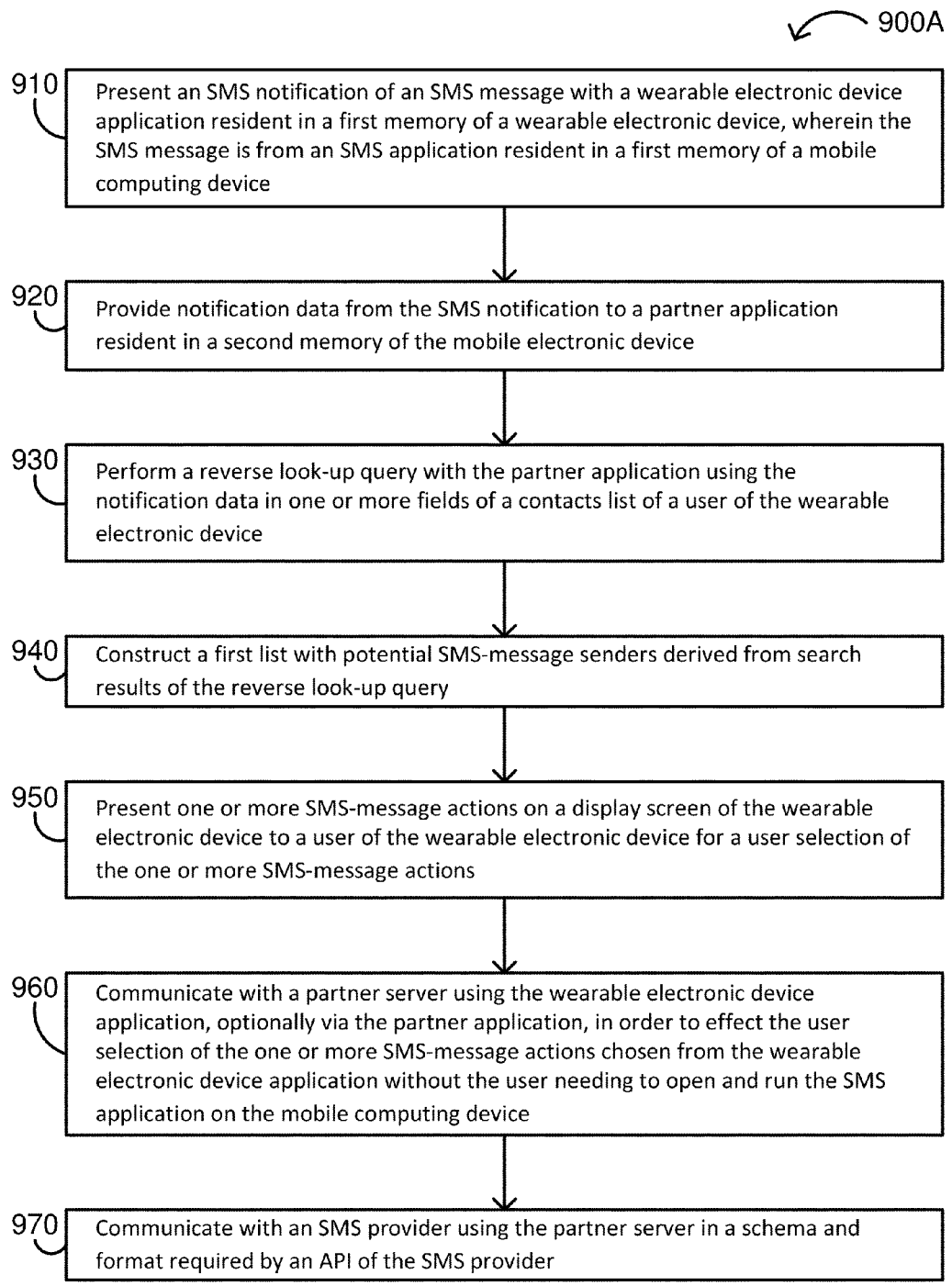
FIG. 8A illustrates a method for taking action on SMS notifications from within a wearable device application in accordance with some embodiments.
Figure 8B:
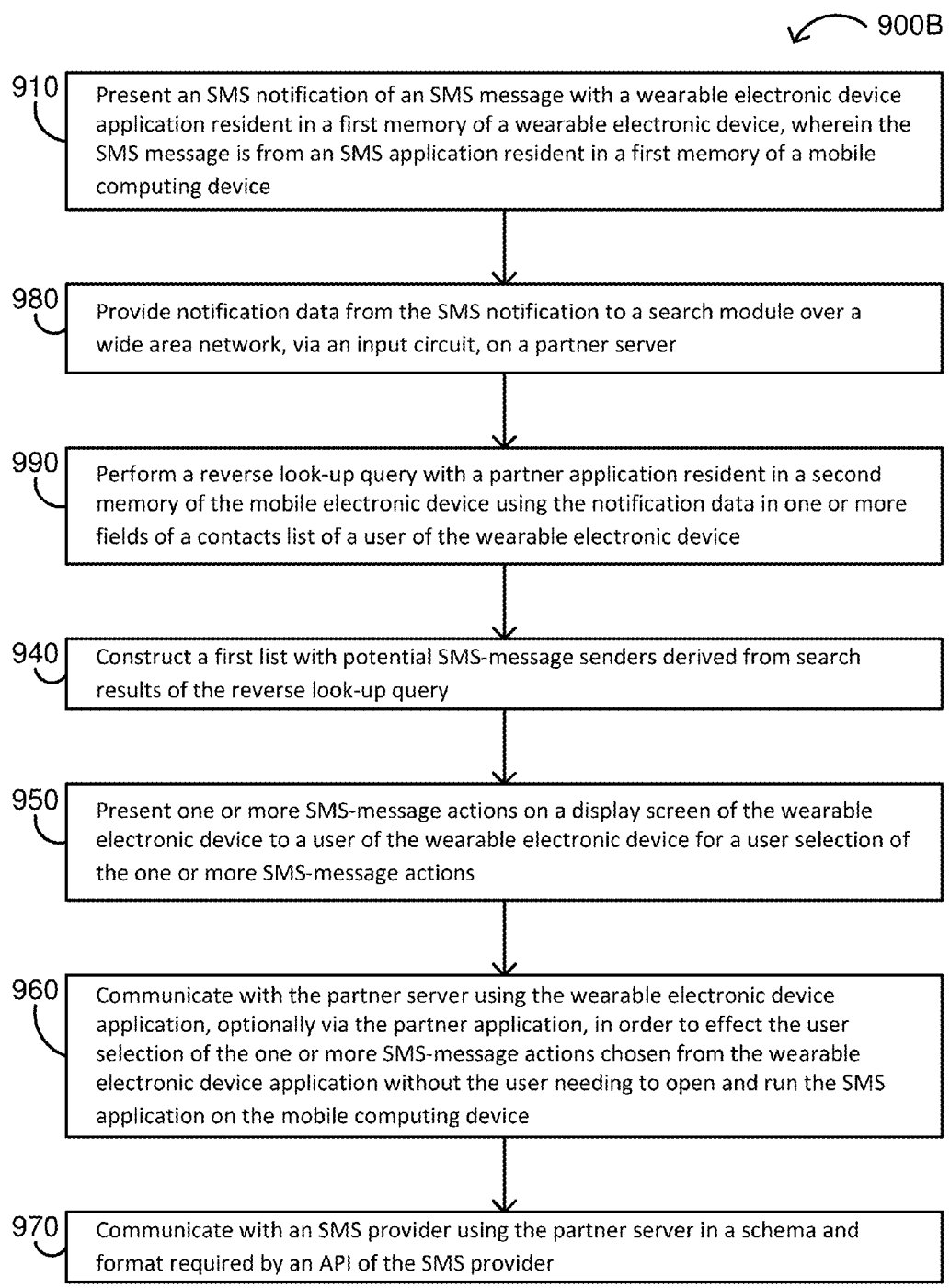
FIG. 8B illustrates a method for taking action on SMS notifications from within a wearable device application in accordance with some embodiments.

FIGS. 8A and 8B respectively illustrate the methods 900A and 900B having a first step 910 of presenting an SMS notification of an SMS message with a wearable device application resident in a first memory of a wearable electronic device. The SMS message can be from an SMS application resident in a first memory of a mobile computing device. FIG. 1A provides an example of presenting an SMS notification of an SMS message with a wearable device application resident in a first memory of a wearable electronic device. FIG. 2 provides an example of an SMS message from an SMS application resident in a first memory of a mobile computing device.

The method 900A has a second step 920 of providing notification data from the SMS notification to a partner application resident in a second memory of the mobile electronic device. FIG. 3C provides an example of providing notification data from the SMS notification to a partner application resident in a second memory of the mobile electronic device. The method 900B has a second step 920 of providing notification data from the SMS notification to a search module over a wide area network, via an input circuit, on a partner server. FIG. 3A provides an example of providing notification data from the SMS notification to a search module over a wide area network The method 900A has a third step 930 of performing a reverse look-up query with the partner application using the notification data in one or more fields of a contacts list of a user of the wearable electronic device. Likewise, the method 900B has a third step 990 of performing a reverse look-up query with a partner application resident in a second memory of the mobile electronic device using the notification data in one or more fields of a contacts list of a user of the wearable electronic device. FIG. 4A provides an example of performing a reverse look-up query with the partner application using the notification data in one or more fields of a contacts list of a user of the wearable electronic device.

The methods 900A and 900B have a fourth step 940 of constructing a first list with potential SMS-message senders derived from search results of the reverse look-up query. FIG. 4A provides an example of constructing a first list with potential SMS-message senders derived from search results of the reverse look-up query.

The methods 900A and 900B have a fifth step 950 of presenting one or more SMS-message actions on a display screen of the wearable electronic device to a user of the wearable electronic device for a user selection of the one or more SMS-message actions. FIG. 1B provides an example of presenting one or more SMS-message actions on a display screen of the wearable electronic device to a user of the wearable electronic device for a user selection of the one or more SMS-message actions.

The methods 900A and 900B have a sixth step 960 of communicating with a partner server using the wearable device application, optionally via the partner application, in order to effect the user selection of the one or more SMS-message actions. FIG. 3A provides an example of communicating with a partner server using the wearable device application, optionally via the partner application. The one or more SMS-message actions can be chosen from the wearable device application without the user needing to open and run the SMS application on the mobile computing device. FIG. 1B provides an example of the one or more SMS-message actions can be chosen from the wearable device application without the user needing to open and run the SMS application on the mobile computing device.

The methods 900A and 900B have a seventh step 970 of communicating with an SMS provider using the partner server in a schema and format required by an API of the SMS provider. FIG. 4C provides an example of communicating with an SMS provider using the partner server in a schema and format required by an API of the SMS provider.

In one embodiment, the software used to facilitate the algorithms discussed herein can be embodied onto a non-transitory machine-readable medium. A machine-readable medium includes any mechanism that stores information in a form readable by a machine (e.g., a computer). For example, a non-transitory machine-readable medium includes read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the design have been shown the design is not to be limited to these embodiments. For example, most functions performed by electronic hardware components can be duplicated by software emulation. Thus, a software program written to accomplish those same functions can emulate the functionality of the hardware components in input-output circuitry. The design is to be understood as not limited by the specific embodiments described herein, but only by scope of the appended claims.

What is claimed is:

1. An apparatus, comprising:
   a wearable device application resident in a first memory of a wearable electronic device configured to cooperate with one or more processors to execute instructions to
   a) present a short message service ("SMS") notification of an SMS message from an SMS application resident in a first memory of a mobile computing device, wherein the SMS notification is displayed on a display screen of the wearable electronic device;
   b) store with a first security algorithm an access token for access to an SMS account of a user as an encrypted access token in the first memory of the mobile computing device and user-provided authentication information for the SMS account as encrypted data in the first memory of the mobile computing device,
      wherein a first routine is configured to periodically refresh the access token for access to the user's SMS account from an SMS provider by periodically supplying the user-provided authentication information in an encrypted form to one or more SMS-message servers,
      wherein a partner server has an authentication module configured to reference SMS-provider authentication processes to obtain access tokens, and
      wherein at least two or more authentication processes are indexed and stored in an authentication database that cooperates with the authentication module on the partner server;
   c) analyze the SMS notification and create and store in the first memory of the wearable electronic device a set of notification data that is derived from the SMS notification;
   d) provide the notification data from the SMS notification to either
      i) a partner application resident in a second memory of the mobile computing device or
      ii) a search module over a wide area network, via an input circuit, on the partner server,
         wherein either the partner application or the search module is configured to
            perform a reverse look-up query using the notification data in one or more fields of a contacts list of the user, the fields of the contacts list resident in the mobile computing device or the partner server, respectively and
            construct a first list with potential SMS-message senders derived from search results of the reverse look-up query; and
   e) present a first user interface with one or more SMS-message actions on the display screen to the user for a user selection of the one or more SMS-message actions,
   wherein the wearable device application is configured to communicate with the partner server, optionally via the partner application, in order to effect the user selection of the one or more SMS-message actions without the user needing to open and run the SMS application on the mobile computing device, to effect the user selection of the one or more SMS-message actions chosen from the wearable device application, and wherein the partner server has an API module configured to communicate in a schema and format required by an API of the SMS provider.

2. The apparatus of claim 1,
   wherein the one or more SMS-message actions are selected from the group consisting of a dismiss action, set reminder, mute thread of conversation, mark as spam, a reply action, a reply-to-all action, a forward action, and a delete action.

3. The apparatus of claim 1,
   wherein the notification data queried in the one or more fields is selected from the group consisting of a sender's first name; the sender's last name; the sender's full name; the sender's username; the sender's phone number; an additional recipient's first name; the additional recipient's last name; the additional recipient's full name; the additional recipient's username; and the additional recipient's phone number.

4. The apparatus of claim 1,
   wherein the wearable device application is configured to communicate, via a wireless communication circuit, with the partner server via the partner application, receive the first list from the partner application, present a second user interface with the first list to the user for a user selection of one or more of the potential SMS-message senders, and store the user's selection of the one or more of the potential SMS-message senders from the first list to assist in retrieving the SMS-message and effect the user selection of the one or more SMS-message actions chosen from the wearable device application.

5. The apparatus of claim 4,
wherein the partner application is configured to construct a query with terms including the one or more potential SMS message senders, along with other metadata including a time stamp of the SMS message and the access token for the user's SMS account to the SMS provider to retrieve the SMS-message from a first SMS server.

6. The apparatus of claim 4,
wherein the partner application is configured to store the user selection of the one or more potential SMS-message senders and the user selection of the one or more potential additional SMS-message recipients in a preferred list for the reverse look-up query, so that once the user positively identifies a particular SMS-message sender or a particular additional SMS-message recipient with the reverse look-up query using the notification data, then the wearable device application is configured to auto-populate information for the particular SMS-message sender or the particular additional SMS-message recipient in the future.

7. The apparatus of claim 4,
wherein the wearable device application is configured to send the user selection of the one or more SMS-message actions, content supplied by the user in response to the SMS message, the user selection of the one or more potential SMS-message senders, and the access token for authorization to the user's SMS account for the SMS provider in order to effect the user selection of the one or more SMS-message actions without the user of the wearable electronic device needing to open and run the SMS application on the mobile computing device.

8. The apparatus of claim 4,
wherein the partner application is configured to
package the user selection of the one or more SMS-message actions, the user selection of the one or more potential SMS-message senders, the access token for authorization to the user's SMS account, and content supplied by the user in response to the SMS message in a package and
provide the package in an encrypted form to the partner server.

9. The apparatus of claim 8,
wherein the wearable electronic device is a smart watch,
wherein the mobile computing device is a smart phone,
wherein the user selection of the one or more SMS-message actions is a reply action or a reply-to-all action, and
wherein the content supplied by the user is a predetermined SMS message.

10. The apparatus of claim 8,
wherein the partner server is configured to
reference the package against a first database of SMS providers and users serviced by the SMS providers and
determine one or more of the SMS providers to use in order to effect the user selection of the one or more SMS-message actions.

11. The apparatus of claim 10,
wherein the partner server is configured to
access a second database of APIs for the SMS providers,
put the package into the schema and format required by the API for each of the SMS providers needed in order to effect the user selection of the one or more SMS-message actions, and
send the package to each of the foregoing SMS providers.

12. The apparatus of claim 11,
wherein the partner server is configured to communicate a successful or failed attempt to effect the user selection of the one or more SMS-message actions to the wearable device application via the partner application.

13. A method, comprising:
a) presenting a short message service ("SMS") notification of an SMS message with a wearable device application resident in a first memory of a wearable electronic device,
wherein the SMS message is from an SMS application resident in a first memory of a mobile computing device;
b) storing with a first security algorithm an access token for access to an SMS account of a user as an encrypted access token in the first memory of the mobile computing device and user-provided authentication information for the SMS account as encrypted data in the first memory of the mobile computing device,
wherein a first routine is configured to periodically refresh the access token for access to the user's SMS account from an SMS provider by periodically supplying the user-provided authentication information in an encrypted form to one or more SMS-message servers,
wherein a partner server has an authentication module configured to reference SMS-provider authentication processes to obtain access tokens, and
wherein at least two or more authentication processes are indexed and stored in an authentication database that cooperates with the authentication module on the partner server;
c) providing notification data from the SMS notification to either
i) a partner application resident in a second memory of the mobile computing device or
ii) a search module over a wide area network, via an input circuit, on the partner server,
wherein the partner server has an API module configured to communicate in a schema and format required by an API of the SMS provider,
wherein either the partner application or the search module is configured to
perform a reverse look-up query using the notification data in one or more fields of a contacts list of a user of the mobile electronic device or the partner server, respectively, and
construct a first list with potential SMS-message senders derived from search results of the reverse look-up query;
d) presenting one or more SMS-message actions on a display screen of the wearable electronic device to a user of the wearable electronic device for a user selection of the one or more SMS-message actions;

e) referencing a package provided by the partner application against a first database on the partner server of SMS providers and users serviced by the SMS providers,
wherein the package includes the user selection of the one or more SMS-message actions, a user selection of one or more potential SMS-message senders, an access token for the SMS provider, and any additional user-selected content or user-created content in association with the user selection of the one or more SMS-message actions;
f) determining one or more of the SMS providers to use in order to effect the user selection of the one or more SMS-message actions;
g) accessing a second database of APIs for the SMS providers on the partner server;
h) putting the package into the schema and format required by the API for each of the SMS providers needed in order to effect the user selection of the one or more SMS-message actions; and
i) sending the package to each of the foregoing SMS providers,
wherein the wearable device application is configured to communicate with the partner server, optionally via the partner application, in order to effect the user selection of the one or more SMS-message actions without the user needing to open and run the SMS application on the mobile computing device to effect the user selection of the one or more SMS-message actions chosen from the wearable device application.

14. The method of claim 13, further comprising
receiving the first list by the wearable device application; and
presenting the first list to the user of the wearable electronic device for the user selection of the one or more of the potential SMS-message senders.

15. The method of claim 14, further comprising
sending the package including the user selection of the one or more SMS-message actions, the user selection of the one or more potential SMS-message senders, the access token for the SMS provider, and the any additional user-selected content or user-created content to the partner server.

16. The method of claim 15, further comprising
packaging the package with the partner application; and then
providing the package to the partner server.

17. A system, comprising:
one or more servers of at least one short message service ("SMS") provider; and
a wearable device application resident in a first memory of a wearable electronic device configured to cooperate with one or more processors to execute instructions to
a) present an SMS notification of an SMS message from an SMS application resident in a first memory of a mobile computing device,
wherein the SMS notification is displayed on a display screen of the wearable electronic device;
b) store with a first security algorithm an access token for access to an SMS account of a user as an encrypted access token in the first memory of the mobile computing device and user-provided authentication information for the SMS account as encrypted data in the first memory of the mobile computing device,
wherein a first routine is configured to periodically refresh the access token for access to the user's SMS account from an SMS provider by periodically supplying the user-provided authentication information in an encrypted form to one or more SMS-message servers,
wherein a partner server has an authentication module configured to reference SMS-provider authentication processes to obtain access tokens, and
wherein at least two or more authentication processes are indexed and stored in an authentication database that cooperates with the authentication module on the partner server;
c) analyze the SMS notification and create a set of notification data that is derived from the SMS notification;
d) provide the notification data from the SMS notification to either
i) a partner application resident in a second memory of the mobile computing device or
ii) a search module over a wide area network, via an input circuit, on the partner server,
wherein either the partner application or the search module is configured to
perform a reverse look-up query using the notification data in one or more fields of a contacts list of the user, the fields of the contacts list of the mobile electronic device or the partner server, respectively, and
construct a first list with potential SMS-message senders derived from search results of the reverse look-up query; and
e) present one or more SMS-message actions on the display screen to the user for a user selection of the one or more SMS-message actions,
wherein the wearable device application is configured to communicate with the partner server, optionally via the partner application, in order to effect the user selection of the one or more SMS-message actions without the user needing to open and run the SMS application on the mobile computing device to effect the user selection of the one or more SMS-message actions chosen from the wearable device application, and
wherein the partner server has an API module configured to communicate in a schema and format required by an API of the SMS provider.

* * * * *